US012126093B2

(12) United States Patent
Jalili et al.

(10) Patent No.: US 12,126,093 B2
(45) Date of Patent: Oct. 22, 2024

(54) RECONFIGURABLE RADIATOR ARRAY SOURCE FOR LENS-COUPLED CONTINUOUS, WIDE-ANGLE, AND DIRECTIVE BEAM STEERING

(71) Applicant: The Regents of the University of California, Oakland, CA (US)

(72) Inventors: Hossein Jalili, Atlanta, GA (US); Omeed Momeni, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 447 days.

(21) Appl. No.: 17/590,566

(22) Filed: Feb. 1, 2022

(65) Prior Publication Data

US 2022/0247075 A1 Aug. 4, 2022

Related U.S. Application Data

(60) Provisional application No. 63/144,053, filed on Feb. 1, 2021.

(51) Int. Cl.
*H01Q 3/00* (2006.01)
*H01Q 3/30* (2006.01)
*H01Q 3/46* (2006.01)
*H01Q 3/26* (2006.01)
*H01Q 3/38* (2006.01)

(52) U.S. Cl.
CPC ................ *H01Q 3/46* (2013.01); *H01Q 3/30* (2013.01); *H01Q 3/26* (2013.01); *H01Q 3/38* (2013.01)

(58) Field of Classification Search
CPC ............ H01Q 3/46; H01Q 3/245; H01Q 3/26; H01Q 3/30; H01Q 3/38; H01Q 1/2283; H01Q 19/062
USPC ................................ 342/368, 371, 372, 373
See application file for complete search history.

(56) References Cited

U.S. PATENT DOCUMENTS 8,830,137 B2 * 9/2014 Sengupta .............. H01Q 13/10 343/866
9,590,300 B2 * 3/2017 Artemenko .......... H01Q 21/065
10,211,528 B2 * 2/2019 Assefzadeh .......... H01Q 3/2682
(Continued)

FOREIGN PATENT DOCUMENTS

KR 102503761 B1 * 2/2023 ............... H01Q 3/26

*Primary Examiner* — Chuong P Nguyen
(74) *Attorney, Agent, or Firm* — Park, Vaughan, Fleming & Dowler LLP

(57) ABSTRACT

In one aspect, a system that provides a lens-integrated reconfigurable radiating source capable of two-dimensional continuous beam steering is disclosed. The system can include a silicon (Si) chip that further comprises a two-dimensional (2D) array of pixel sources/unit cells, wherein each unit cell in the 2D array includes an on-chip antenna for radiating power. The system further includes Si lens coupled to the silicon chip for controlling a directivity of a radiation beam generated by the chip. Note that the unit cells in the 2D array of unit cells can be independently activated to generate high-directivity radiation beams in a discrete set of firing angles. Moreover, the 2D array is configured to effectuate injection locking between adjacent unit cells in the 2D array when the adjacent unit cells are turned on simultaneously, wherein the injection locking effectuates a coherent radiation beam that can be continuously steered within a scanning range with fine resolution.

27 Claims, 16 Drawing Sheets

LENS-INTEGRATED THZ RADIATOR SOURCE 100

(56) References Cited

U.S. PATENT DOCUMENTS

| | | | | |
|---|---|---|---|---|
| 10,224,638 | B2 * | 3/2019 | Artemenko | H01Q 15/08 |
| 10,886,963 | B2 * | 1/2021 | Sengupta | H04B 1/0458 |
| 11,962,091 | B2 * | 4/2024 | Buadana | H01Q 3/30 |
| 2010/0103043 | A1 * | 4/2010 | Milano | H03B 5/1852<br>342/368 |
| 2014/0077995 | A1 * | 3/2014 | Artemenko | H01Q 3/24<br>343/754 |
| 2015/0116154 | A1 * | 4/2015 | Artemenko | H01Q 19/17<br>342/374 |
| 2016/0087344 | A1 * | 3/2016 | Artemenko | H01Q 21/29<br>343/753 |

* cited by examiner

LENS-INTEGRATED RECONFIGURABLE RADIATOR SYSTEM 300

ON/ON OPERATION MODE 700

ACTIVATED 1X1 SINGLE PIXEL SUB-ARRAY 800

RECONFIGURABLE RADIATOR ARRAY SOURCE FOR LENS-COUPLED CONTINUOUS, WIDE-ANGLE, AND DIRECTIVE BEAM STEERING

CROSS-REFERENCE TO RELATED APPLICATION

This application claims the benefit of priority under 35 U.S.C. 119(e) to U.S. Provisional Patent Application Ser. No. 63/144,053, entitled "Reconfigurable Radiator Array Source for Lens-Coupled Continuous, Wide-Angle, and Directive Beam Steering,", filed on Feb. 1, 2021, the contents of which are incorporated by reference herein.

GOVERNMENT LICENSE RIGHTS

This invention was made with U.S. government support under grant number 1454732 awarded by the National Science Foundation (NSF). The U.S. government has certain rights in the invention.

BACKGROUND

Field

The disclosed embodiments generally relate to the design of phased arrays. More specifically, the disclosed embodiments relate to the design of a reconfigurable radiator array that enables continuous, uninterrupted and scalable electronic beam steering with high directivity in a lens-integrated source array.

Related Art

High-resolution and fast imaging/sensing at Terahertz (THz) frequencies requires highly directive and steerable beams for scanning an object. A coherent array of coupled sources can improve the total radiated power. However, conventional coupled radiator arrays generally employ a mechanical and slow scanning mechanism to steer the radiating beam to scan an object. Phased array systems can use electronic beam steering to scan an object at a higher speed, but large array sizes with high power consumption are needed in the phased-array systems to generate a highly directive and narrow beam to achieve high image resolution.

Although silicon (Si) lens can be used to increase beam directivity in a phased array, the beam steering capability can be significantly diminished when a Si lens is integrated with a phased array. An array of non-coherent sources has been used in conjunction with a Si lens to illuminate different regions of an object so that each individual source can have a high directivity. In such systems, the firing angle of each source is determined by the ratio of its displacement from the lens center to the lens radius. However, this type of imaging sources can only image/scan an object in discrete steps with scanning resolution determined by a beam spacing, which itself is constrained by the inevitable distance between adjacent sources on the chip. Moreover, being constrained to using independent individual pixels for object illumination and imaging can lead to loss of resolution and blind zones between the neighboring illumination beams. A larger lens can improve the resolution by reducing the beam spacing, but at the cost of a reduced total scanning range.

Hence, what is needed is a THz radiator array design that does not suffer from the above-mentioned drawbacks of existing designs.

SUMMARY

Embodiments of this disclosure provide a reconfigurable radiator array structure that combines two beam steering techniques: (1) antenna displacement and (2) phase shifting. The combination achieves both high directivity and fine scanning resolution through continuous steering between the beams of the adjacent pixel sources, while consuming little power. In various embodiments, a reconfigurable radiator array is a two-dimensional (2D) array of pixel sources/unit cells, wherein each pixel source/unit cell is capable of injection locking to its adjacent cells if two neighboring pixel sources/unit cells are turned on at the same time. Hence, individual pixel sources/unit cells or a subsection of the radiator array can be turned on to enable phase/frequency locking between the activated cells, thereby generating a radiation beam in a desirable direction.

Furthermore, the circuit structure in the disclosed radiator array is configured to enable multi-beam radiation by simultaneously activating multiple sub-arrays that do not have intersecting corners between the activated sub-arrays. In some embodiments, to increase beam steering resolution and cover a blind zone between two adjacent beams produced by individual unit cells, individual unit cells can be activated simultaneously to form a single radiation beam through injection locking, and then steering the beam within the blind zone by controlling the relative phase shift between two injection-locked cells.

In one aspect, a system that provides a lens-integrated reconfigurable radiating source capable of two-dimensional continuous beam steering is disclosed. The system can include a silicon (Si) chip that further comprises a two-dimensional (2D) array of pixel sources/unit cells, wherein each unit cell in the 2D array includes an on-chip antenna for radiating power. The system further includes Si lens coupled to the silicon chip for controlling a directivity of a radiation beam generated by the chip. Note that the unit cells in the 2D array of unit cells can be independently activated to generate high-directivity radiation beams in a discrete set of firing angles. Moreover, the 2D array is configured to effectuate injection locking between adjacent unit cells in the 2D array when the adjacent unit cells are turned on simultaneously, wherein the injection locking effectuates a coherent radiation beam that can be continuously steered within a scanning range with fine resolution.

In some embodiments, each unit cell in the 2D array comprises: (1) two standing wave oscillators (SWO) configured to generate a standing wave at a fundamental frequency; and (2) a coupling network coupled between the two SWOs and configured to extract the 4th harmonic of the standing wave which is fed to the on-chip antenna for radiation.

In some embodiments, each unit cell in the 2D array is controlled by a gate bias voltage independent from other gate bias voltages for controlling other unit cells in the 2D array, which allows for turning each unit cell on and off independently from other unit cells in the 2D array.

In some embodiments, each unit cell in the 2D array is coupled to neighboring unit cells through a set of capacitors $C_c$ in both horizontal and vertical directions. Moreover, the set of capacitors $C_c$ becomes termination capacitors when the unit cell is turned off, thereby suppressing the loading effect of the unit cell on an activated unit cell in the neighboring unit cells.

In some embodiments, when two adjacent unit cells are simultaneously activated, the resulting radiation beam can be steered by controlling a relative phase shift between the two adjacent unit cells to cover a blind zone between two adjacent radiation beams produced when the two adjacent unit cells are individually activated.

In some embodiments, the relative phase shift between the two adjacent activated unit cells are controlled by changing the difference between the two gate bias voltages of the two adjacent activated unit cells.

In some embodiments, the 2D array includes a set of transistor switches located at four corners of each unit cell. Note that the set of transistor switches in each unit cell are automatically controlled by the gate bias voltage, thereby configuring the 2D array for proper operation when different unit cells are turned on or off.

In some embodiments, when a unit cell in the 2D array is turned off, the associated transistor switches are automatically closed. The closed set of transistors turns capacitors $C_c$ coupled to the unit cell into termination capacitors for the neighboring unit cells unit cells, thereby suppressing loading effects from the turned-off unit cell and ensuring undisturbed operation of activated cells in the neighboring unit cells.

In some embodiments, when a unit cell in the 2D array is turned on, the associated transistor switches are open, which allows the unit cell to couple to the neighboring unit cells through associated capacitors for $C_c$ injection locking.

In some embodiments, when unit cells in a subsection of the 2D array are turned on, associated capacitors $C_c$ act as coupling capacitors between the activated unit cells in the subsection while act as terminations at edges of the subsection.

In some embodiments, the 2D array is configured to activate individual unit cells to facilitate generating individual high-directivity radiation beams in a discrete set of desired radiation angles.

In some embodiments, the 2D array is configured to activate different sub-arrays of unit cells to facilitate generating different steerable radiation beams that can be continuously steered within blind zones created by the discrete set of desired radiation angles.

In some embodiments, the continuous beam steering of a steerable radiation beam is achieved by combining the following two steering techniques: (1) providing unit coarse steering through an antenna displacement of an activated unit cell relative to a center of the Si lens; (2) providing high-resolution steering through a varying phase shift between two adjacent activated unit cells to cover a blind zone between two discrete radiation beams generated by the same two adjacent unit cells when they are independently activated.

In some embodiments, the 2D array is configured to effectuate a multi-beam radiation operation by simultaneously activating multiple subarrays in different regions within the 2D array which do not have intersecting corners.

In some embodiments, the multi-beam radiation operation includes generating two steerable radiation beams from two independently activated sub-arrays, wherein each of the activated sub-arrays includes at least two adjacent activated unit cells that are injection-locked to each one another. In the multi-beam radiation operation, the two steerable radiation beams are used to independently scan two desirable scanning ranges in either the same angular dimension or in two orthogonal angular dimensions.

In some embodiments, the first sub-array in the two independently activated sub-arrays includes at least two adjacent unit cells in a same row in the 2D array of unit cells for scanning a first scanning range in a first angular dimension. The second sub-array in the two independently activated sub-arrays includes at least two adjacent unit cells in a same column in the 2D array of unit cells for scanning a second scanning range in a second angular dimension orthogonal to the first angular dimension. Note that the first sub-array and the second sub-array have no overlapping unit cells.

In some embodiments, the lens-integrated system also includes a wafer of a predetermined thickness sandwiched between the Si lens of hemispherical shape and the chip, wherein the predetermined thickness of the wafer provides an extension length to the height of the hemispherical Si lens.

In another aspect, a reconfigurable radiator array is disclosed. This reconfigurable radiator array includes a two-dimensional (2D) array of unit cells, wherein each unit cell in the 2D array further includes: a 4th-harmonic standing wave oscillator (SWO); and an on-chip antenna for radiating power. The reconfigurable radiator array also includes radiation control circuitry coupled to each unit cell in the 2D array and configured to activate a single unit cell in the 2D array to generate a high-directivity radiation beam in a single direction. In some embodiments, the radiation control circuitry in the reconfigurable radiator array is also configured to simultaneously activate two adjacent unit cells in the 2D array to effectuate injection locking between the two adjacent unit cells, thereby effectuates a coherent and steerable radiation beam that can be steering within a desirable scanning range.

In some embodiments, the radiation control circuitry controls each unit cell in the 2D array by controlling a gate bias voltage independent from other gate bias voltages for controlling other unit cells in the 2D array, thereby allowing for turning each unit cell on and off independently from other unit cells in the 2D array.

In some embodiments, each unit cell in the 2D array is coupled to neighboring unit cells through a set of capacitors $C_c$ in both horizontal and vertical directions. Moreover, the set of capacitors $C_c$ becomes termination capacitors when the unit cell is turned off, thereby suppressing the loading effect of the unit cell on an activated unit cell in the neighboring unit cells.

In some embodiments, each unit cell includes a set of transistor switches located at four corners of the unit cell, wherein the set of transistor switches are automatically controlled by the gate bias voltage.

In some embodiments, when the unit cell is turned off, the set of transistor switches are automatically closed, which turns the set of capacitors $C_c$ coupled to the unit cell into termination capacitors for the neighboring unit cells unit cells, thereby suppressing loading effects from the turned-off unit cell and ensuring undisturbed operation of activated cells in the neighboring unit cells.

In some embodiments, the radiation control circuitry is configured to effectuate a multi-beam radiation operation in the 2D array of unit cells by simultaneously activating multiple subarrays in different regions within the 2D array which do not have intersecting corners.

In some embodiments, the radiation control circuitry effectuates the multi-beam radiation operation by generating two steerable radiation beams from two independently activated sub-arrays in the 2D array of unit cells. Each of the two activated sub-arrays includes at least two adjacent activated unit cells that are injection-locked to each one another, and the two steerable radiation beams are used to independently scan two desirable scanning ranges in either the same angular dimension or in two orthogonal angular dimensions.

In some embodiments, the first sub-array in the two independently activated sub-arrays includes at least two adjacent unit cells in a same row in the 2D array of unit cells for scanning a first scanning range in a first angular dimension. The second sub-array in the two independently activated sub-arrays includes at least two adjacent unit cells in a same column in the 2D array of unit cells for scanning a second scanning range in a second angular dimension orthogonal to the first angular dimension. Note that the first sub-array and the second sub-array have no overlapping unit cells.

In yet another aspect, a process for providing continuous beam steering using a reconfigurable radiating source comprising a two-dimensional (2D) array of unit cells is disclosed. This process includes simultaneously activating two adjacent unit cells in the 2D array of unit cells to effectuate injection locking between the two adjacent unit cells, thereby obtaining a coherent radiation beam in a specific radiation angle. The process then steers the coherent radiation beam within a target scanning range by controlling a relative phase shift between the two adjacent activated unit cells. Specifically, the process controls the relative phase shift between the two adjacent activated unit cells by controlled a difference between the two gate bias voltages of the two adjacent activated unit cells.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Terminology

Throughout this patent disclosure, the terms "a pixel source," "a radiator cell" and "a unit cell" are used interchangeably to mean a single independent power generation and emission source that forms the base element within the disclosed two-dimensional reconfiguration radiator array.

Overview

Embodiments of this disclosure provide a reconfigurable radiator array structure that combines two beam steering techniques: (1) antenna displacement and (2) phase shifting. The combination achieves both high directivity and fine scanning resolution through continuous steering between the beams of the adjacent pixel sources, while consuming little power. In various embodiments, a reconfigurable radiator array is a two-dimensional (2D) array of pixel sources/unit cells, wherein each pixel source/unit cell is capable of injection locking to its adjacent cells if two neighboring pixel sources/unit cells are turned on at the same time. Hence, individual pixel sources/unit cells or a subsection of the radiator array can be turned on to enable phase/frequency locking between the activated cells, thereby generating a radiation beam in a desirable direction.

Furthermore, the circuit structure in the disclosed radiator array is configured to enable multi-beam radiation by simultaneously activating multiple sub-arrays that do not have intersecting corners between the activated sub-arrays. In some embodiments, to increase beam steering resolution and cover the blind zone between two adjacent beams produced by individual unit cells, individual unit cells can be activated simultaneously to form a single radiation beam through injection locking, and then the beam can be steered within the blind zone by controlling the relative phase shift between two injection-locked cells.

Figure 1A:
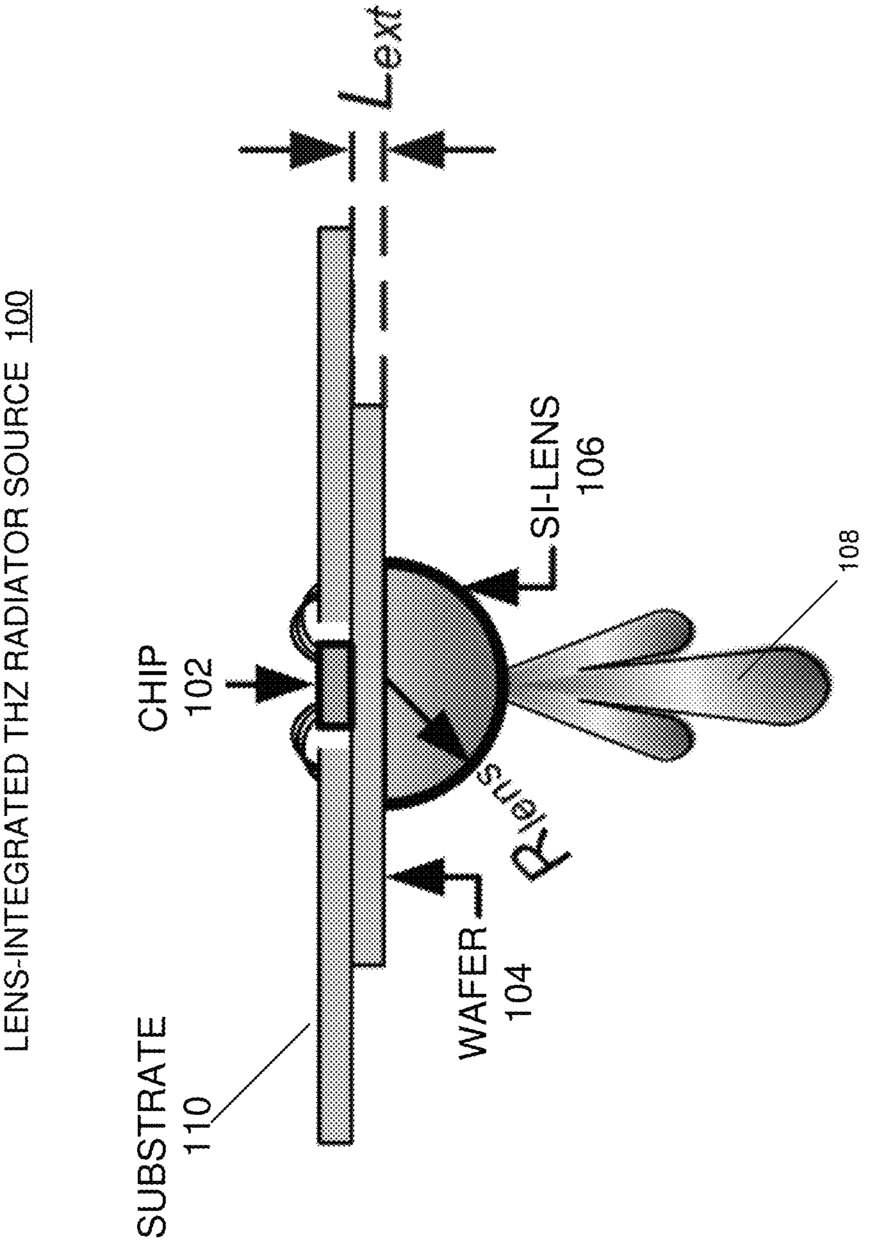
FIG. 1A shows a schematic diagram of a lens-integrated THz radiator source that includes a radiator-array chip, a wafer and a silicon lens for fast high-resolution THz imaging and sensing applications in accordance with some embodiments package in accordance with some embodiments.

FIG. 1A shows a schematic diagram of a disclosed lens-integrated THz radiator source 100 that includes a radiator-array chip 102, a wafer 104 and a silicon lens 106 for fast high-resolution THz imaging and sensing applications in accordance with some embodiments. As can be seen in FIG. 1A, lens-integrated THz radiator source 100 generates a radiation beam 108 that is emitted from radiator-array chip 102, transmitted through wafer 104 (e.g., a silicon wafer), and focused by silicon lens 106 into a narrower radiation beam pattern and higher beam directivity. Note that while the directivity of a radiation beam emitted by radiator-array chip 102 can be boosted by lens 106, lens 106 has a limiting effect on the scanning range of the radiation beam. Generally speaking, the radiation pattern of radiation beam 108 is primarily determined by the following factors: (1) the on-chip antenna that emits the output power; (2) the size of the lens defined by lens radius denoted as $R_{lens}$; (3) the thickness of the silicon wafer between the substrate 110 of chip 102 and base-surface of the hemispherical lens 106, denoted as $L_{ext}$; and (4) the displacement/offset of a given on-chip antenna from the center of lens 106. Note that the thickness of the wafer 104 $L_{ext}$, can be equivalently viewed as an extension length of a hyper hemispherical lens. Note that the disclosed lens-integrated THz radiator source 100 is configured to generate a wide-angle high-directivity electronic beam steering capable of imaging and scanning an object or a sample under test with fine resolution. Note that the field of view and scanning resolution of the lens-integrated THz radiator source 100 are generally determined by beam directivity, steering resolution and steering range of radiation beam 108.

Figure 1B:
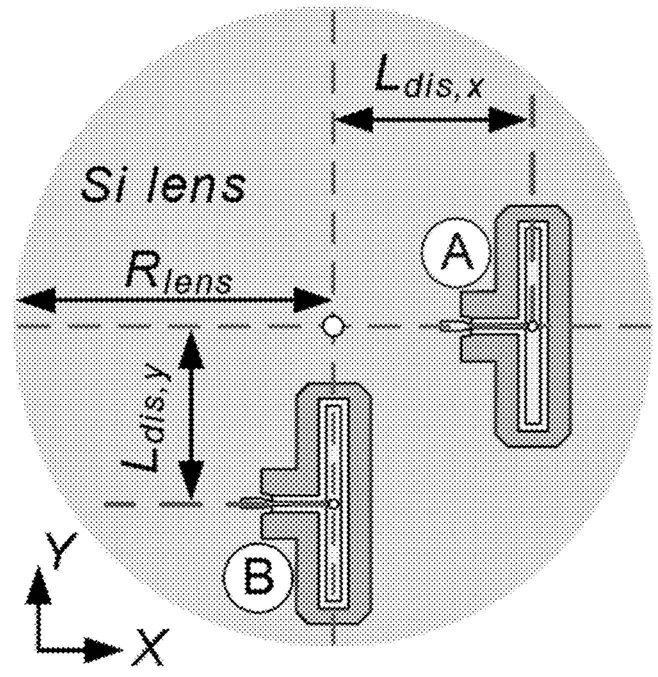
FIG. 1B shows a top view of the lens-integrated THz radiator source in FIG. 1A highlighting two independent radiation sources/antennas A and B within the radiator-array chip and their displacements relative to the center of the silicon lens in accordance with some embodiments.

FIG. 1B shows a top view of lens-integrated THz radiator source 100 highlighting two independent radiation sources/antennas A and B within radiator-array chip 102 and their displacements relative to the center of the silicon lens in accordance with some embodiments. As can be seen in FIG. 1B, radiation source/antenna A is displaced from lens center primarily in the X direction by a distance of $L_{dis,x}$; whereas radiation source/antenna B is displaced from lens center primarily in the Y direction by a distance of $L_{dis,y}$. Note that the displacement of a given radiation source/antenna determines the associated firing angle, which is generally proportional to $L_{dis}/R_{lens}$.

Figure 1C:
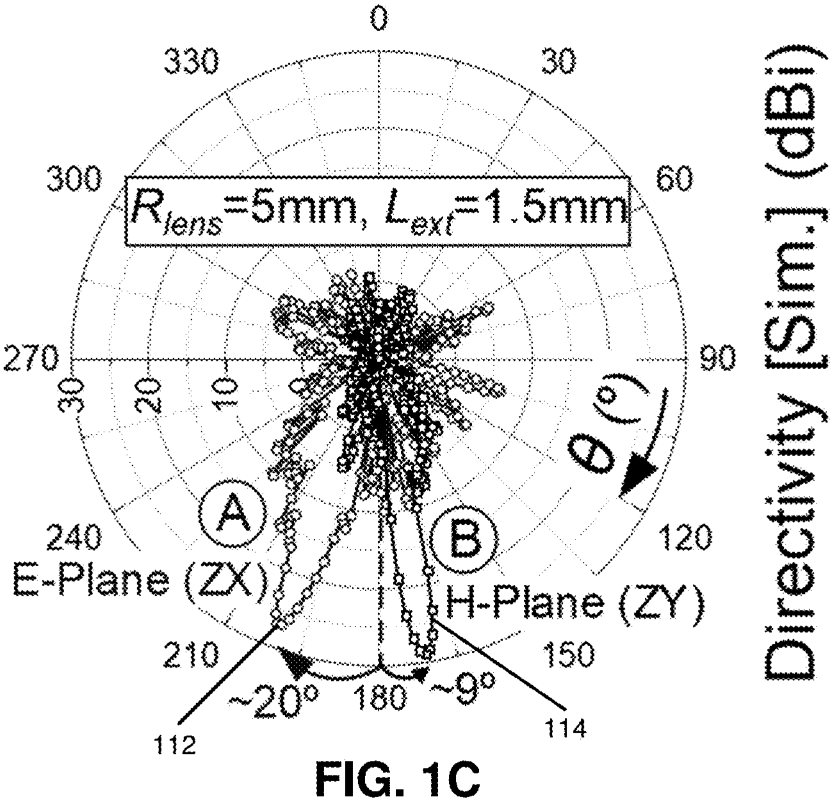
FIG. 1C shows measured radiation patterns and radiation angles of the two independent radiation sources A and B in the radiator-array chip in accordance with some embodiments.

FIG. 1C shows measured radiation patterns and radiation angles of the two independent radiation sources A and B in radiator-array chip 102 in accordance with some embodiments. As can be seen in FIG. 1C, radiation beam 112 generated by radiation source A is in the Z-X plane (also referred to as the "E-plane") whereas radiation beam 114 generated by radiation source B is in the Z-Y plane (also referred to as the "H-plane"). In a non-coherent array source, displacement offsets of individual sources or pixels determine the available firing angles, as shown in the FIG. 1C. For example, it is possible to steer the radiation beam from the angle defined by radiation beam 112 in the E-plane to a different angle defined by radiation beam 114 in the H-plane. However, using only the beam steering technique of activating individual radiation sources in chip 102, the beam can just be steered in discrete angles without the capability to cover the blind zone between these directions.

Figure 2:
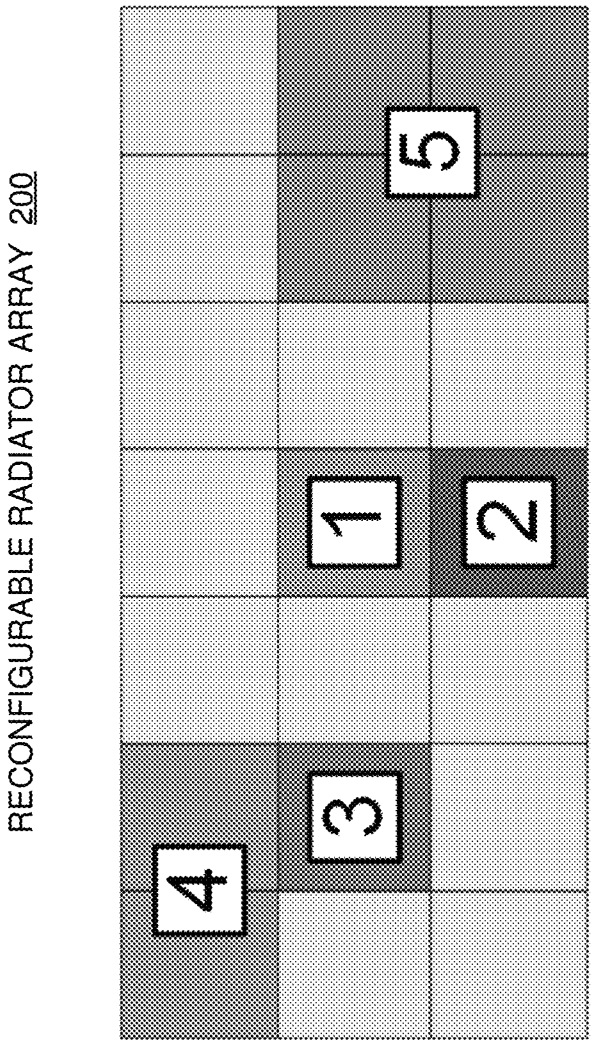
FIG. 2 shows a schematic diagram of the proposed reconfigurable radiator array comprising 3×7 unit cells wherein each of the radiator cells can be independently turned on or turned off to generate various desirable radiation patterns in accordance with some embodiments.

FIG. 2 shows a schematic diagram of the proposed reconfigurable radiator array 200 (also referred to as "reconfigurable array 200" hereinafter) comprising 3×7 pixel sources/radiator cells (also referred to as "unit cells" hereinafter) wherein each of the pixel sources/unit cells can be independently turned on or turned off to generate various desirable radiation patterns in accordance with some embodiments. Note that the proposed reconfigurable radiator array 200 can be implemented on radiator-array chip 102 in lens-integrated THz radiator source 100. In some embodiments, each unit cell in reconfigurable array 200 is capable of injection locking to one or more of its neighboring/adjacent unit cells if the given unit cell and the one or more of the adjacent unit cells are turned on at the same time. As a result, when two neighboring/adjacent unit cells in reconfigurable array 200 are turned on simultaneously, the pair of adjacent unit cells is automatically frequency- and phase-locked to each other. The circuitry of each given unit cell in reconfigurable array 200 is further designed such that the loading on an activated (i.e., "ON") unit cell from the adjacent inactive (i.e. "OFF") units cells is suppressed. This ensures that that the operating frequency and the output power level of reconfigurable array 200 experience minimal variations in different modes of activations.

Note that FIG. 2 also shows 5 exemplary activation modes corresponding to 5 sub-array configurations in reconfigurable array 200. These 5 activation modes include 3 single unit-cell activation modes: (1) a center unit cell activation mode which is marked with label "1"; (2) a center-bottom unit cell activation mode which is marked with label "2"; and (3) a center-left unit cell activation mode which is marked with label "3". Additionally, the 5 activation modes shown include a double-unit-cell activation mode corresponding to a sub-array of two adjacent unit cells (i.e., "1×2 sub-array") located at the upper left corner of reconfigurable array 200, which is marked with label "4". Finally, the 5 activation modes shown include a quadruple-unit-cell activation mode corresponding to a sub-array of four adjacent unit cells (i.e., "2×2 sub-array") located at the lower right corner of reconfigurable array 200, which is marked with label "5". Note that each of these 5 activation modes in reconfigurable array 200 can be independently activated and any two activation modes among the 5 activation modes can be simultaneously activated if these two activation modes do not have intersecting corners.

In some embodiments, multiple activation modes among the 5 activation modes in reconfigurable array 200 can be simultaneously and independently activated to generate multiple independent radiation beams assuming the subarrays in the multiple activation modes do not have intersections between them (also referred to as "intersecting corners"). This proposed multi-beam radiation operation generates two or more radiation beams at different firing angles that are independent of each other. Note that the independent operation of the two or more radiation beams can mean that each of the two or more radiation beams can operate independently in terms of both the direction of the radiation beam and the frequency of radiation. For example, the aforementioned operation modes 4 and 5 among the 5 activation modes can be simultaneously and independently activated, creating two non-intersecting radiation beams firing into two distinctive directions/regions that can have different operating frequencies. Note that the 5 activation modes described in conjunction with FIG. 2 are just some examples of selectable subsections within reconfigurable array 200, and many other activation modes corresponding to other sub-arrays/subsections within reconfigurable array 200 different from the described 5 activation modes exist and can be selected for desirable radiation patterns.

Figure 3:
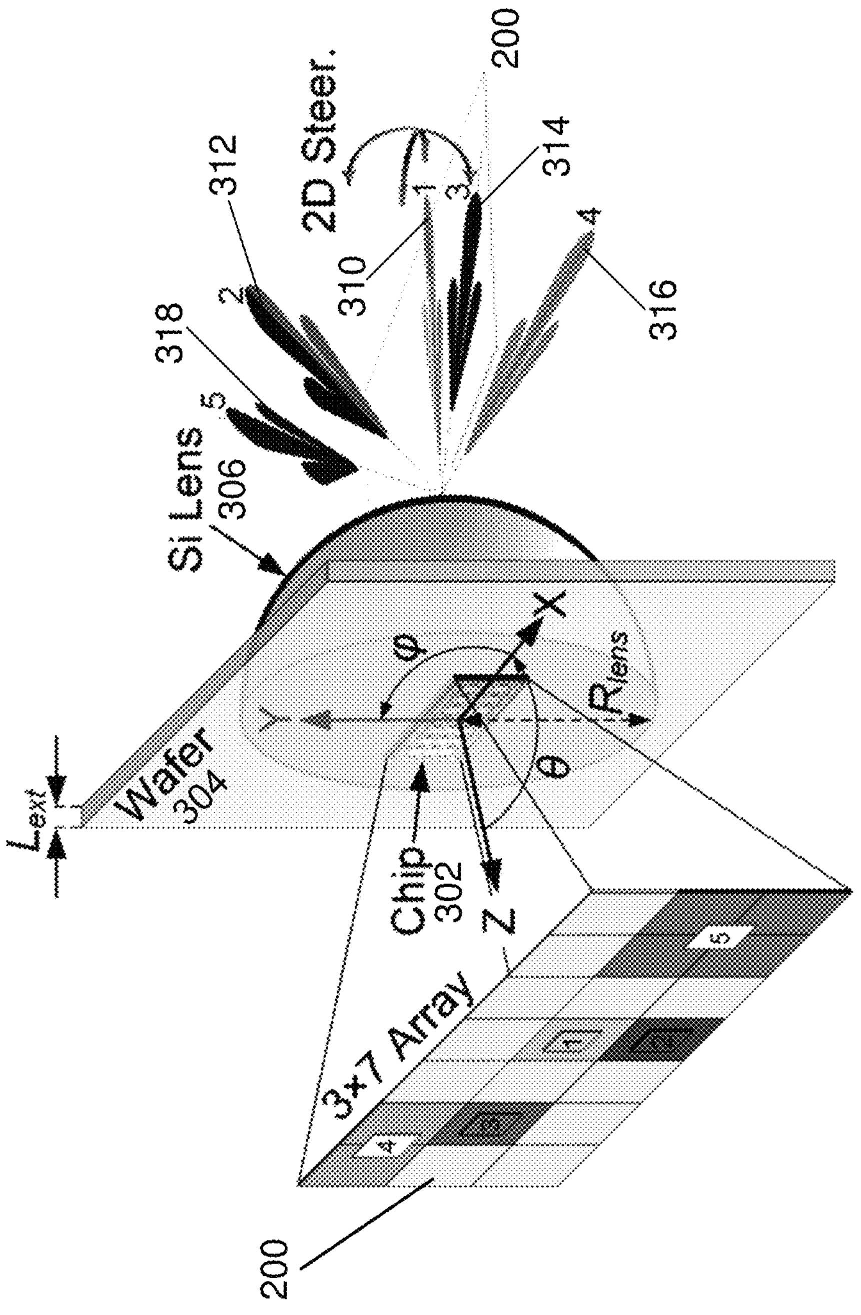
FIG. 3 shows a lens-integrated reconfigurable radiator system that is composed of a chip containing the disclosed reconfigurable radiator array, a wafer, and a silicon lens in accordance with some embodiments.

FIG. 3 shows a lens-integrated reconfigurable radiator system 300 (or "reconfigurable radiator system 300"), which is composed of a chip 302 containing reconfigurable radiator array 200, a wafer 304, and a silicon lens 306, in accordance with some embodiments. As can be seen in FIG. 3, chip 302 is attached to the back side of wafer 304 facing away from silicon lens 306 and centered on lens 306. Moreover, the center unit cell "1" with array indices (2, 4) or more precisely the antenna in unit cell "1" in reconfigurable array 200 is positioned at the center of lens 304. Hence, when unit cell "1" is turned on, reconfigurable radiator system 300 generates a center radiation beam 310 with both E-plane angle (θ) and H-plane angle (φ) close to zero. As described above, individual pixels/unit cells in reconfigurable array 200, and hence in chip 302 can be independently turned on and turned off. As described above, the radiation angle of each unit cell in the chip 302 is generally determined by the position of the unit cell relative to the center of lens 306. Generally speaking, the firing angle of each pixel source/unit cell is proportional to the ratio of unit-cell displacement ($L_{dis}$) from the center of lens 306 to the radius ($R_{lens}$) of lens 306. This means that a larger lens 306 will generally further limit the radiation/scanning range of chip 302, even though the directivity of the radiation beam from each pixel source is generally increased with the size of lens 306.

For example, when unit cell "2" is turned on, reconfigurable radiator system 300 generates a radiation beam 312 in the H-plane with a near zero θ value but finite φ angle. Similarly, when unit cell "3" is turned on, reconfigurable radiator system 300 generates a radiation beam 314 in the E-plane with a near zero φ value but finite θ angle. Moreover, in the proposed multi-beam operation mode, multiples of the non-intersecting single unit cells in chip 302, which can be considered as different sub-arrays/subsections in chip 302, can be activated at the same time to generate multiple independent radiation beams of distinct radiation angles. For example, both sub-array "1" and sub-array "3" can be turned on at the same time to generate radiation beams 310 and 314; or both sub-array "2" and sub-array "3" can be turned on at the same time to generate radiation beams 312 and 314.

Moreover, a group of adjacent unit cells in chip 302 in various sub-array configurations, such as in 1×2, 2×1, 2×2, 1×3, or 3×1 configuration, etc., can be turned on simultaneously and phase/frequency locked to one another to form a single coherent radiation source through injection locking. For example, the two unit-cells in 1×2 sub-array "4" in chip 302 can be turned on simultaneously and phase/frequency locked with each other to generate a single radiation beam 316 in a direction with both large φ and θ values. Similarly, the group of four unit cells in the 2×2 sub-array "5" in chip 302 can be turned on simultaneously and phase/frequency locked with one another to generate a single radiation beam 318 in a direction with both large φ and θ values opposite to the radiation beam 316. Again, the radiation angle of a given multi-pixel sub-array in chip 302 is determined by the displacement of the sub-array relative from the center of lens 306 and the lens radius $R_{lens}$. Moreover, in the proposed multi-beam operation mode, these multi-pixel sub-arrays in reconfigurable radiator system 300 that have no intersecting corners can be activated at the same time to generate multiple radiation beams of distinct radiation angles and optionally at different operating frequencies. For example, both the 1×2 sub-array "4" and the 2×2 sub-array "5" can operate concurrently to generate two independent radiation beams 316 and 318 in two distinctively different directions.

In various embodiments, reconfigurable array 200 in reconfigurable radiator system 300 is configured to achieve continuous scanning/steering within the above-described blind zone between two discrete radiation beams generated by two adjacent pixel sources/unit cells, e.g., the angular space between radiation beams 310 and 312. This continuous steering functionality is achieved by simultaneously activating the two neighboring unit cells and by controlling a relative phase shift/angle between the two unit cells through standing wave coupling. However, before describing the proposed continuous and fine-resolution beam steering functionality and technique in the reconfigurable array 200, we first describe embodiments of the circuit designs of pixel sources/unit cells in the reconfigurable array 200.

Figure 4B:
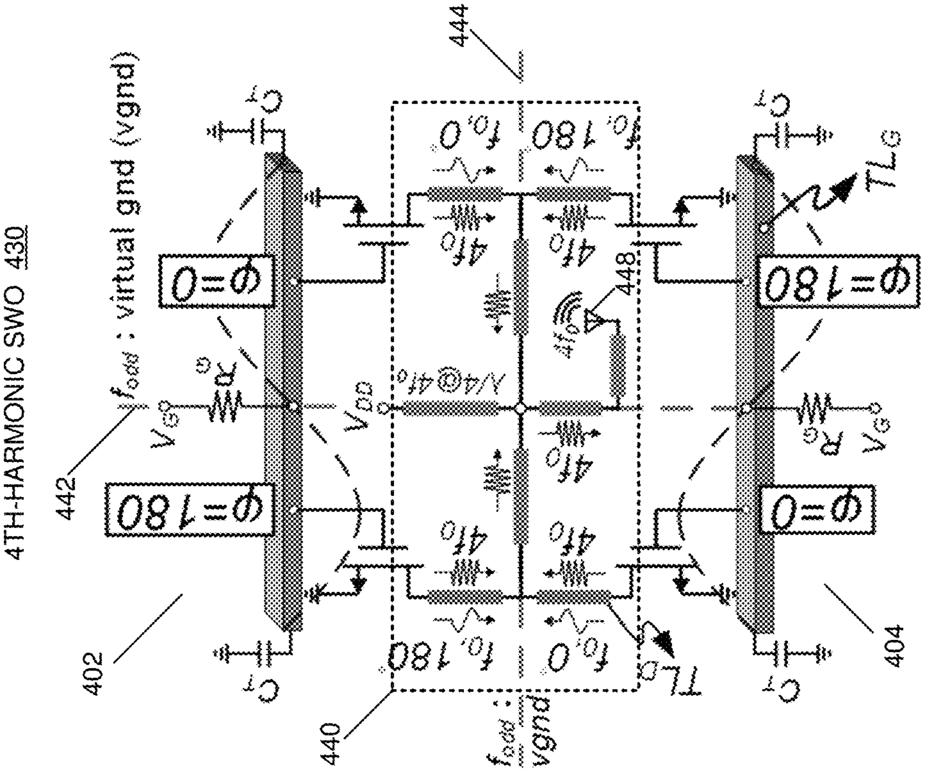
FIG. 4B shows a fourth (4th)-harmonic SWO based on the conceptual standing wave oscillator 400 for building a single unit cell within the disclosed reconfigurable radiator array in accordance with some embodiments.
Figure 4A:
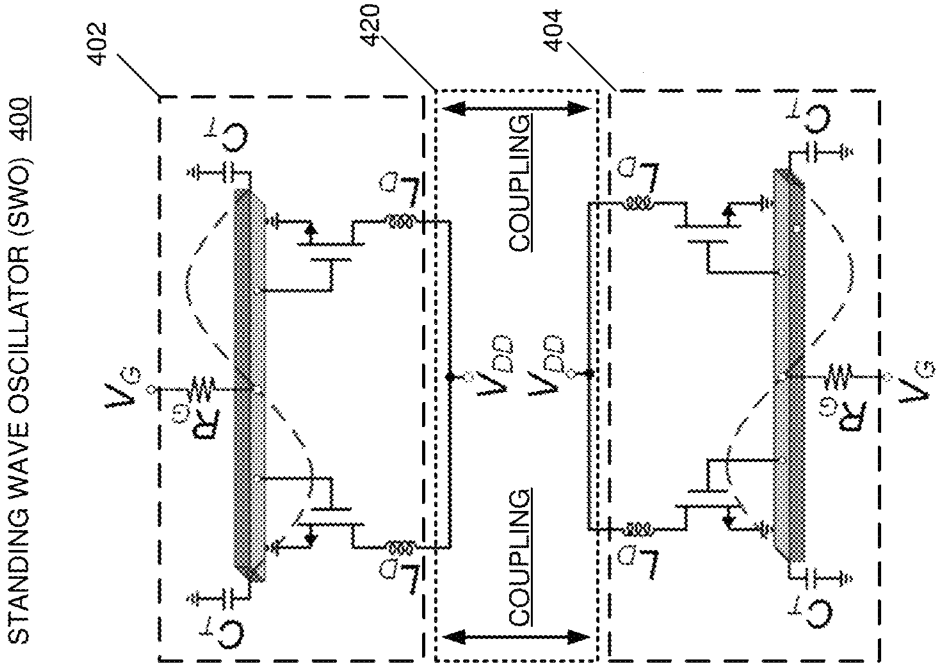
FIG. 4A shows a conceptual standing-wave oscillator (SWO) for building pixel sources/unit cells within the disclosed reconfigurable radiator array in accordance with some embodiments.

FIG. 4A shows a conceptual standing wave oscillator 400 for building pixel sources/unit cells within the disclosed reconfigurable radiator array in accordance with some embodiments. As can be seen in FIG. 4A, conceptual standing wave oscillator (SWO) 400 includes two identical simple/fundamental SWOs 402 and 404 arranged facing each other, wherein each simple SWO 402 or 404 is configured with a respective transmission line 412 or 414 (also referred to as "gate line 412 or 414" because they are coupled to the gate of the transistors) and two termination capacitors $C_T$ coupled to both end of gate line 412 or 414. Hence, under normal operation, traveling waves in each simple SWO 402 or 404 reflect back and forth in gate line 412 or 414 between the two respective termination capacitors $C_T$ and superpose to form a fundamental standing wave having the fundamental frequency $f_0$ of the disclosed unit cell operation. Moreover, two simple SWO 402 and SWO 404 in conceptual standing wave oscillator 400 are coupled to each other through a coupling network 420 (not explicitly shown), which is part of the conceptual SWO 400.

FIG. 4B shows a fourth (4th)-harmonic SWO 430 based on the conceptual standing wave oscillator 400 for building a single unit cell within the disclosed reconfigurable radiator array in accordance with some embodiments. As can be seen in FIG. 4B, 4th-harmonic SWO 430 includes the two simple SWOs 402 and 404, which are coupled to each other at the corresponding transistors through coupling network 440. Moreover, coupling network 440 is composed of a two-dimensional (2D) network of transmission lines. Note that coupling network 440 has a symmetric configuration in both a vertical plane of symmetry 442 and a horizontal plane of symmetry 444. Moreover, of the four transistors in SWO 402 and SWO 404 that are coupled to coupling network 440, each transistor is configured to operate out-of-phase with its two adjacent transistors in both the same SWO and the opposite SWO. This results in virtual AC grounds in both planes of symmetry 442 and 444. As a result, the fundamental frequency $f_0$ and its odd harmonics are systematically canceled out at these virtual grounds whereas the even harmonics of $f_0$, including the fourth harmonic at $4f_0$ are combined in these planes. The coupling network 440 is further configured so that 4th harmonic power at $4f_0$ can be extracted and fed into an antenna 448 located near the center of coupling network 440/SWO 430 for emitting the output power of SWO 430. In some embodiments, antenna 448 can be implemented as an on-chip folded slot antenna.

Figure 5A:
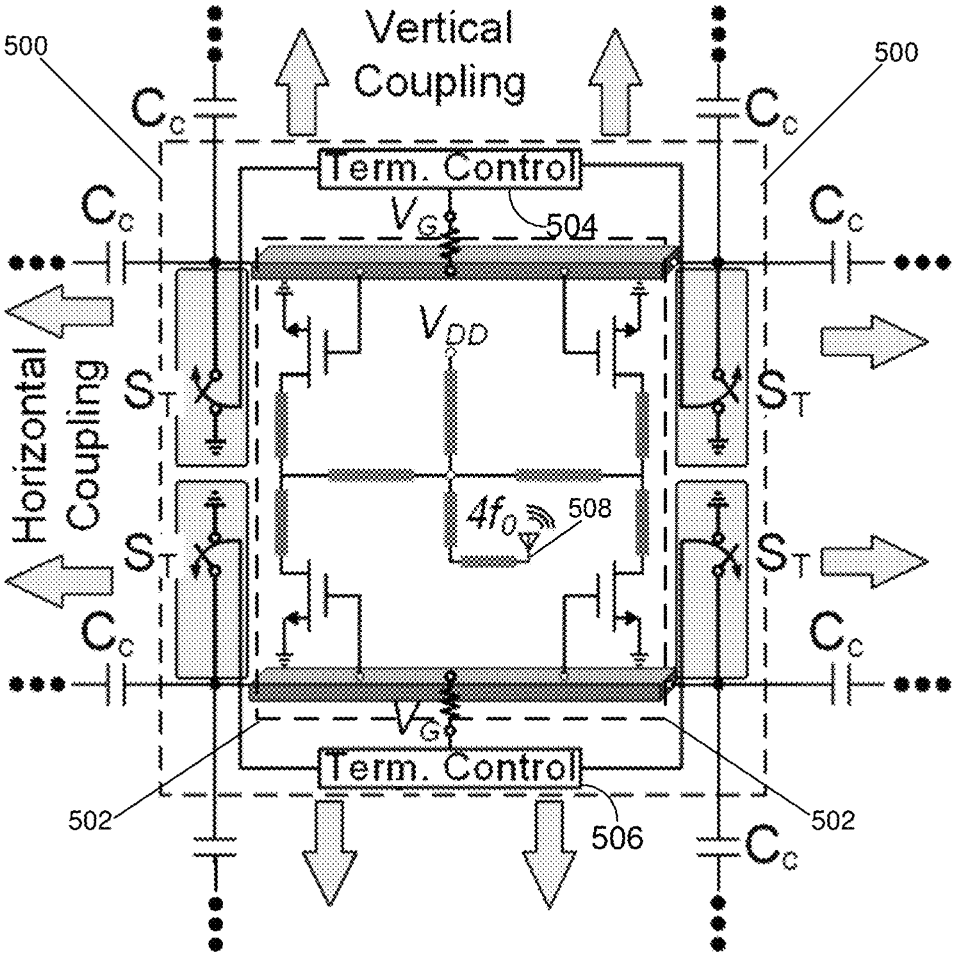
FIG. 5A shows a proposed unit-cell circuitry for implementing unit cells within the disclosed reconfigurable radiator array including coupling capacitors and termination switches in accordance with some embodiments.

While 4th-harmonic SWO 430 is used to demonstrate the principle of 4th-harmonic power generation, it needs to be modified to be used to build the unit cells in the disclosed reconfigurable radiator array. FIG. 5A shows a proposed unit-cell circuitry 500 for implementing unit cells within the disclosed reconfigurable radiator array including coupling capacitors and termination switches, in accordance with some embodiments. As can be seen in FIG. 5A, at the core of unit-cell circuitry 500 is a 4th-harmonic SWO 502 that is substantially the same as 4th-harmonic SWO 430 described above, but without the termination capacitors $C_T$. Instead, unit-cell circuitry 500 includes four termination switches $S_T$, each of which is coupled between one of the four corners of 4th-harmonic SWO 502 (e.g., at the ends of the two gate lines) and the ground, and controlled by the gate bias voltage ($V_G$) of the transistors within 4th-harmonic SWO 502. Again, an antenna 508 is placed near the center of 4th-harmonic SWO 502 for power radiation. Moreover, unit-cell circuitry 500 also includes two termination control modules 504 and 506 which are configured to activate/turn on or deactivate/turn off unit-cell circuitry 500 by controlling the four termination switches $S_T$. Generally speaking, the 4th-harmonic SWO 502, the four termination switches $S_T$, and termination control modules 504 and 506 form a single pixel source/unit cell in the disclosed reconfigurable radiator array. We describe the functions and operations of termination switches $S_T$ and termination control modules 504 and 506 in more detail below.

Note that at each corner of unit-cell circuitry 500, two coupling capacitors $C_c$ are placed such that one terminal of each coupling capacitor $C_c$ is coupled to the non-ground terminal of the termination switch $S_T$ placed at the same corner of unit-cell circuitry 500. Moreover, the two coupling capacitors $C_c$ at each corner of unit-cell circuitry 500 are configured such that one coupling capacitor $C_c$ is oriented in the horizontal direction for coupling unit-cell circuitry 500 to an adjacent unit cell in the horizontal direction; and the other coupling capacitor $C_c$ is oriented in the vertical direction for coupling unit-cell circuitry 500 to an adjacent unit cell in the vertical direction. Hence, there can be a total of 8 coupling capacitors $C_c$ coupled to each unit-cell circuit structure 500: 4 horizontal coupling capacitors $C_c$ and 4 vertical coupling capacitors $C_c$ that are configured to couple unit-cell circuit structure 500 to each of the four adjacent unit cells (assuming unit-cell circuit structure 500 is not on the edge of the array) in the disclosed reconfigurable radiator array.

A person skilled in the art will appreciate that each of the coupling capacitors $C_c$ is coupled between, and therefore is shared by, two neighboring unit cells in the disclosed reconfigurable radiator array. As such, the 8 coupling capacitors $C_c$ in FIG. 5A are reasonably shown outside of the boundary of unit-cell circuit structure 500 not being a part of unit-cell circuit structure 500. As will be described in more detail below, employment of these coupling capacitors allows for controlling the gate bias $V_G$ of the transistors in unit-cell circuit structure 500 independently, thereby making it possible to activate/turn on or deactivate/turn off individual unit cells independently.

Figure 5B:
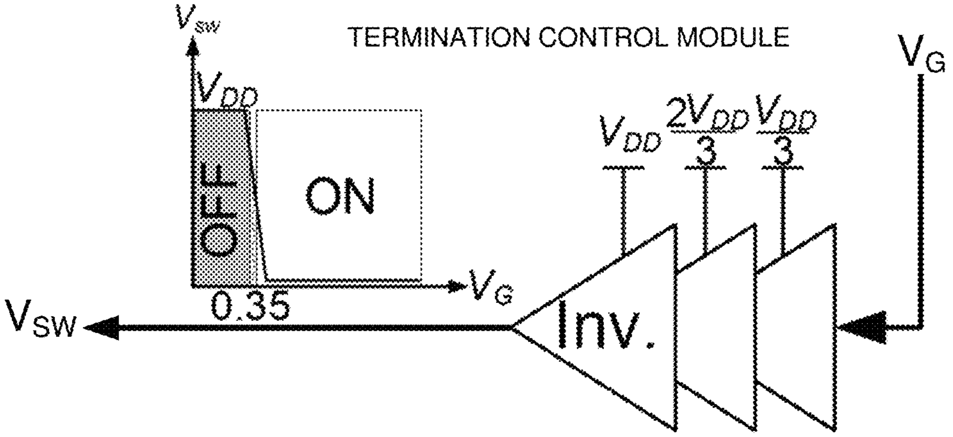
FIG. 5B shows a circuit diagram of an exemplary implementation of the termination control modules in accordance with some embodiments.

More specifically, each of termination control modules 504 and 506 is carefully designed to automatically adjust the operation modes of unit-cell circuit structure 500 between the ON mode and OFF mode by controlling the 4 termination switches $S_T$ based on the values of the gate bias $V_G$. FIG. 5B shows a circuit diagram of an exemplary implementation of the termination control modules (504 and 506) in accordance with some embodiments. As can be seen in FIG. 5B, the termination control mechanism is essentially an inverter with a carefully set threshold voltage of $V_G$ (e.g., $V_{TH}$=0.35 V) that automatically adjusts the termination of unit-cell circuit structure 500 in ON and OFF modes by controlling the OPEN and CLOSE modes termination switches $S_T$ through control voltage $V_{SW}$, which switches between $V_{DD}$ and zero.

Specifically, when unit-cell circuit structure 500 is in the OFF mode, all four switches $S_T$ are automatically closed (i.e., shorted to the ground), which turns each coupling capacitor $C_c$ coupled to unit-cell circuit structure 500 into a termination capacitor for the adjacent cells, thereby suppressing the loading effect of the OFF unit-cell circuit structure 500 on any of the activated unit cells adjacent to OFF unit-cell circuit structure 500. Consequently, the overall power consumption of the disclosed reconfigurable radiator array can be preserved. In contrast, when unit-cell circuit structure 500 is in the ON mode, all four switches $S_T$ are open, allowing unit-cell circuit structure 500 to be coupled to its neighboring unit cells through coupling capacitors $C_c$, and extending the length of the standing wave formed on the gate lines. In some embodiments, the loss from the switches $S_T$ can be minimized by placing these switches $S_T$ at the nodes of the standing waves formed in unit-cell circuit structure 500. We further demonstrate below that, when a subsection of the disclosed reconfigurable radiator array is in ON mode (i.e., all unit cells in the subsection are activated), capacitors $C_c$ act as coupling capacitors when they are located between the activated unit cells, and also act as terminations when they are located on the edges of the subsection.

Figure 6:
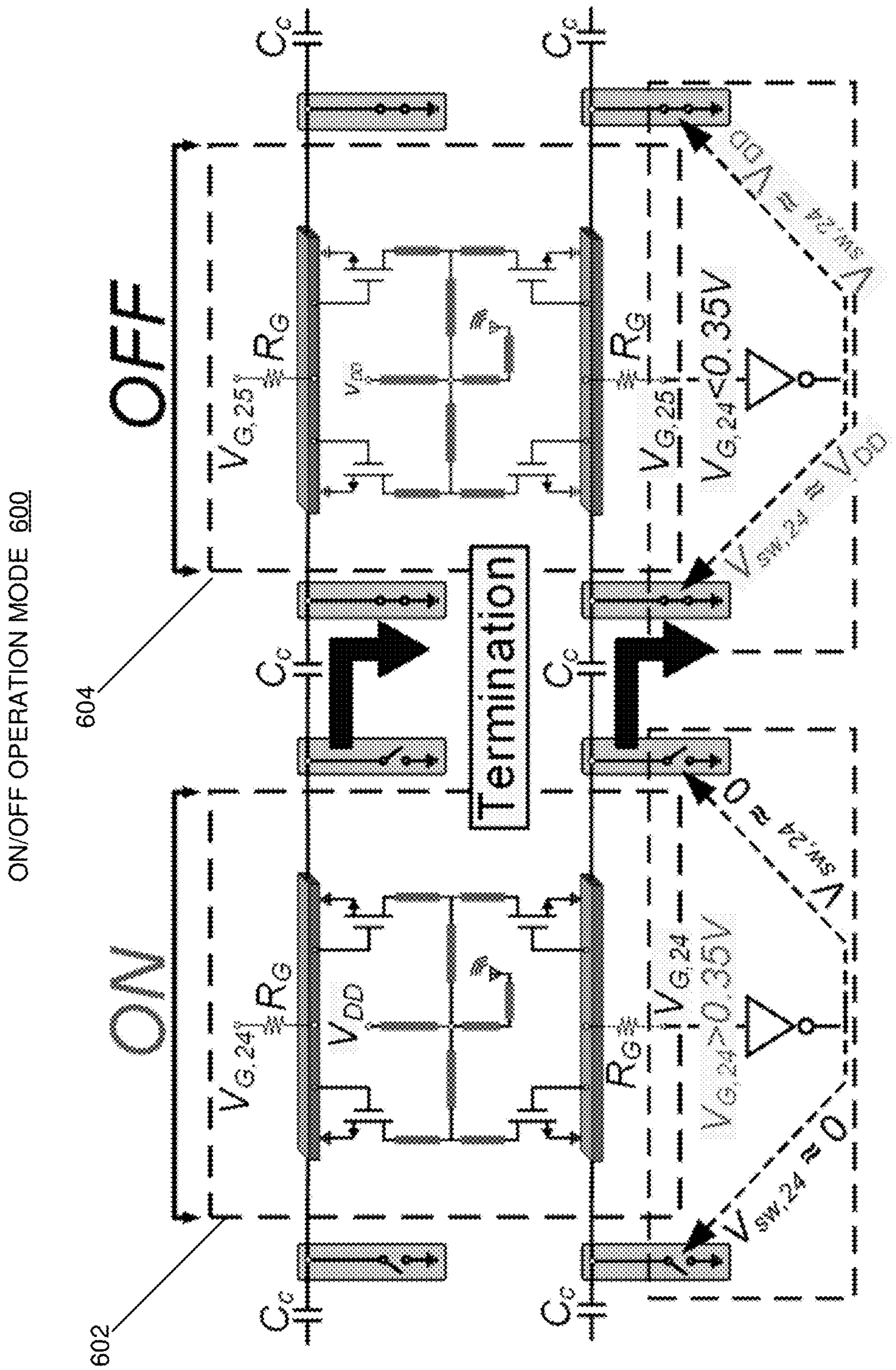
FIG. 6 shows the circuit diagram of two adjacent unit cells in the disclosed reconfigurable radiator array in the ON/OFF operation mode in accordance with some embodiments.

FIG. 6 shows the circuit diagram of two adjacent unit cells in the disclosed reconfigurable radiator array in the ON/OFF operation mode 600 in accordance with some embodiments. As can be seen in FIG. 6, the unit cell 602 on the left is in the ON mode because all termination switches in unit cell 602 are open; while the unit cell 604 on the right is in the OFF mode because all termination switches in unit cell 604 are closed. As a result, the two coupling capacitors between unit cell 602 and unit cell 604 become terminations for the ON cell 602, suppressing the unwanted loading from the OFF cell 604, thus preserving the desired operation conditions for the ON cell 602. Note that for an activated sub-array in the disclosed reconfigurable radiator array, the illustrated ON/OFF mode in FIG. 6 applies to each activated unit cell positioned on an edge of the activated sub-array.

Figure 7:
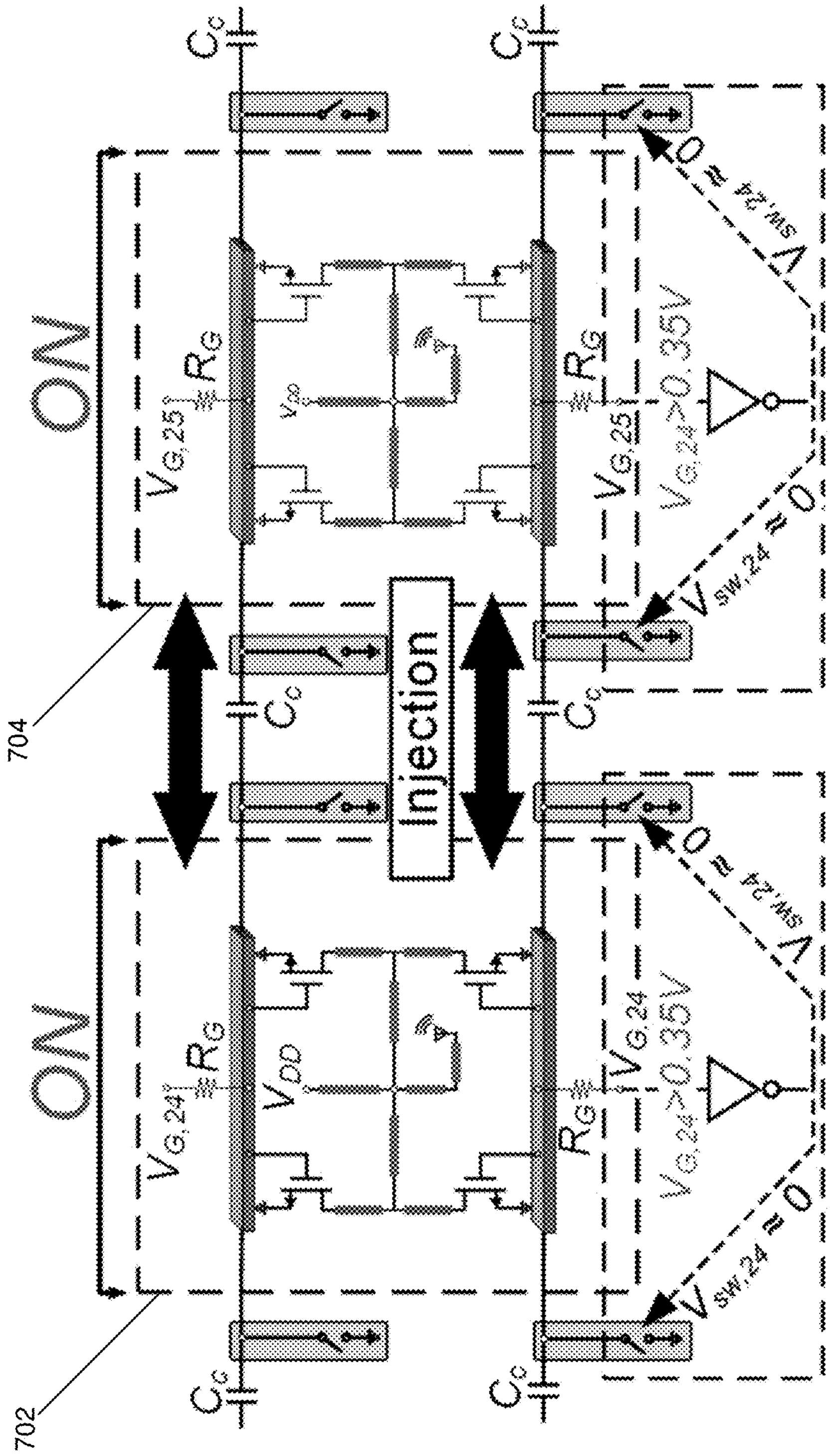
FIG. 7 shows the circuit diagram of two adjacent unit cells in the disclosed reconfigurable radiator array in the ON/ON operation mode in accordance with some embodiments.

FIG. 7 shows the circuit diagram of two adjacent unit cells in the disclosed reconfigurable radiator array in the ON/ON operation mode 700, in accordance with some embodiments.

As can be seen in FIG. 7, both a unit cell 702 on the left and a unit cell 704 on the right are in the ON mode because all termination switches in these unit cells are open. This allows for injection coupling between unit cells 702 and 704 through the two capacitors $C_c$ coupled between the two cells. Moreover, the gate bias $V_{G,24}$ in unit cells 702 and the gate bias $V_{G,25}$ in unit cell 704 are set above the threshold voltage $V_{TH}$ of the transistors in these cells (e.g., $V_{TH}$=0.35V), so that all transistors are also in the ON mode. As a result, the switch control voltages $V_{SW,24}$ and $V_{SW,25}$ are near zero, which keeps termination switches open. Note that the scenario illustrated in FIG. 7 is applicable to any two adjacent unit cells in the row (horizontal) direction inside an activated sub-array of cells described above. In various embodiments, the coupling capacitors and the termination switches within unit cells 702 and 704 are located at the nodes of the standing wave within the respective unit cells which have close-to-zero AC amplitudes. This design feature ensures that these capacitors and termination switches have minimal contribution to the loss of the unit cells under the AC operations.

Figure 8:
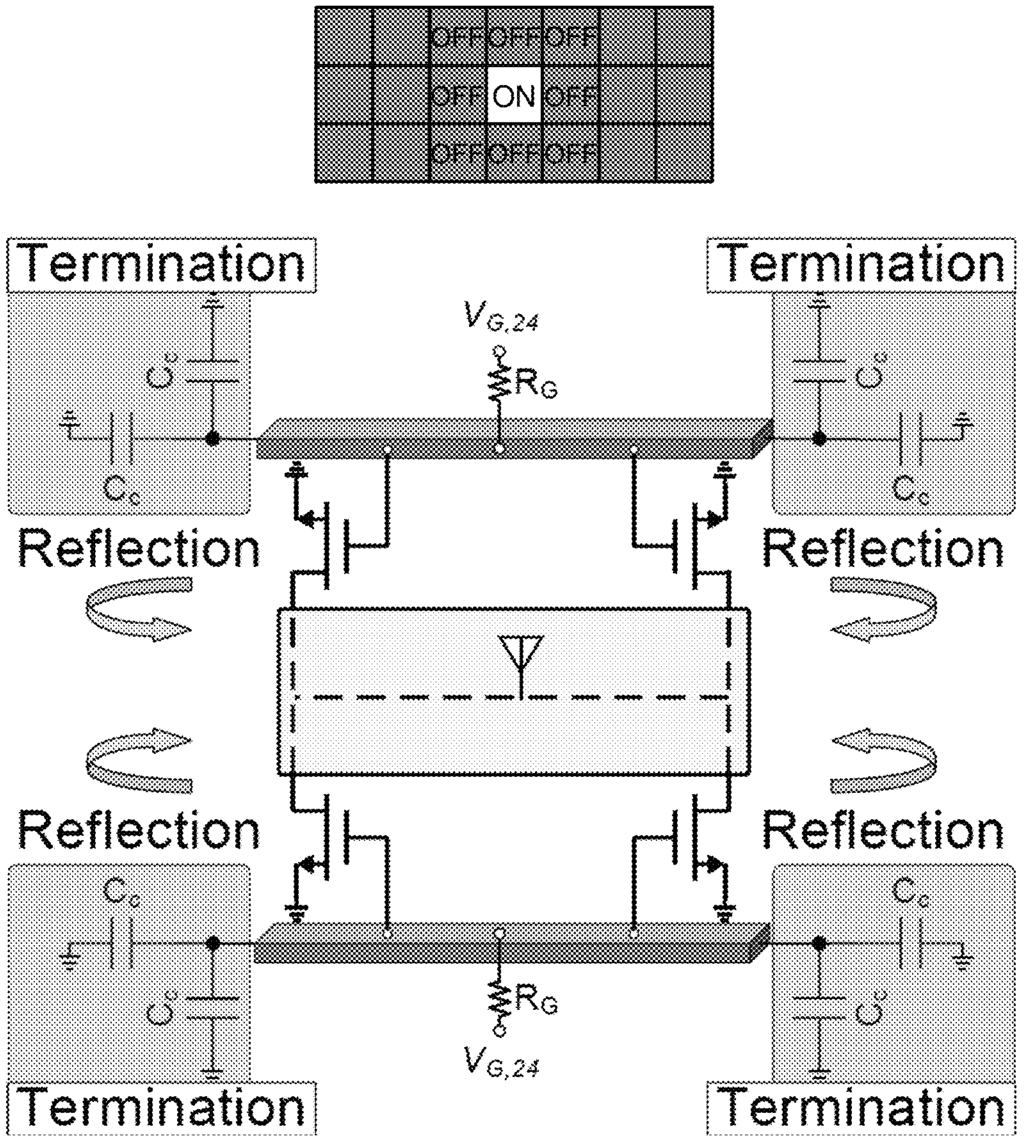
FIG. 8 shows the circuit diagram of an activated sub-array of a single pixel source/unit cell in the center of the disclosed 3×7 reconfigurable array surrounded by OFF cells in accordance with some embodiments.

FIG. 8 shows the circuit diagram of an activated sub-array 800 of a single pixel source/unit cell in the center of the disclosed 3×7 reconfigurable array 200 surrounded by OFF cells in accordance with some embodiments. As can be seen in FIG. 8, all capacitors $C_c$ coupled to the single activated unit cell 800 form terminations at the four corners of the cell.

Figure 9:
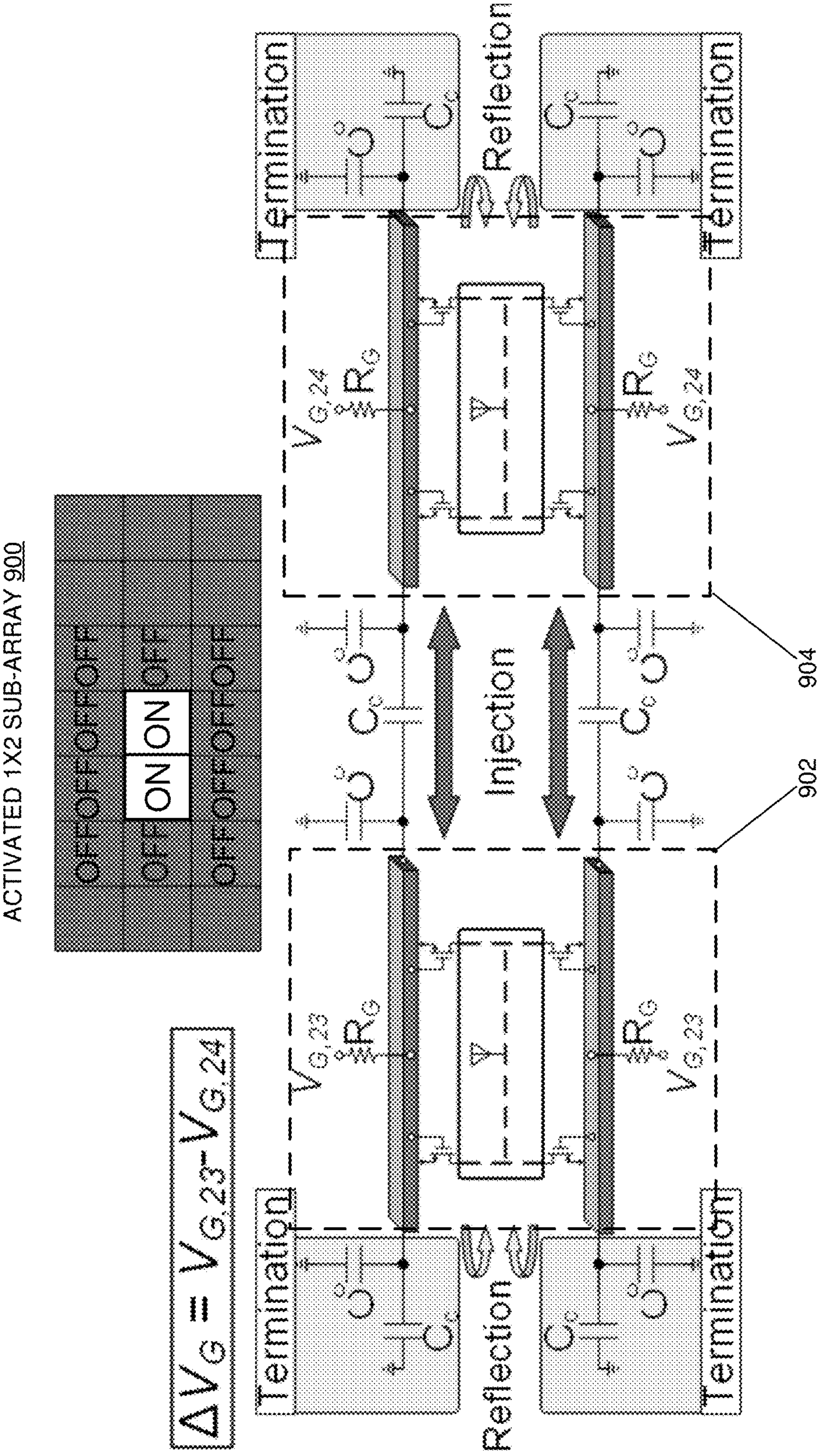
FIG. 9 shows the circuit diagram of an activated sub-array of 1×2 unit cells in the disclosed 3×7 reconfigurable array surrounded by OFF cells in accordance with some embodiments.

FIG. 9 shows the circuit diagram of an activated sub-array 900 of 1×2 unit cells in the disclosed 3×7 reconfigurable array 200 surrounded by OFF cells in accordance with some embodiments. As can be seen in FIG. 9, activated sub-array 900 includes two unit cells 902 and 904 which are injection coupled in a row direction through the two horizontal coupling capacitors $C_c$ between unit cells 902 and 904. It is assumed that unit cells 902 and 904 have been activated simultaneously to effectuate the injection locking. Moreover, the four capacitors coupled to the left corners of unit cells 902 and the four capacitors coupled to the right corners of unit cells 904 form the terminations at the left and right edges of sub-array 900. These terminations on both edges of sub-array 900 allow power to be reflected back and forth between the two edges of sub-array 900. The injection locking effect between unit cells 902 and 904 generates a coherent radiation beam with a radiation/firing angle between the two radiation angles when the two unit cells 902 and 904 are independently activated. Note that unit cells 902 and 904 have the corresponding (row, column) indices of (2, 3) and (2, 4) respectively within reconfigurable array 200.

The injection locking between unit cells 902 and 904 also can be controlled by $\Delta V_G$: a differential voltage between gate bias voltages between the two coupled unit cells, wherein $\Delta V_G = V_{G,23} - V_{G,24}$. When $\Delta V_G=0$, unit cells 902 and 904 generate respective standing waves which produce in-phase $4^{th}$ harmonic output power. As a result, the generated coherent radiation beam of sub-array 900 has a radiation angle half way between the two radiation angles when the two unit cells 902 and 904 are individually activated.

However, when $\Delta V_G \neq 0$, a residual traveling wave is generated on top of the already existed standing wave within sub-array 900 as a result of a negative resistance imbalance. More specifically, this residual traveling wave transfers power from the one unit cell in sub-array 900 that has the larger negative resistance to the other unit cell in sub-array 900 that has the smaller negative resistance. The residual traveling wave creates a non-zero phase shift between the output powers of unit cells 902 and 904, which causes the coherent radiation beam of sub-array 900 to become controllable and steerable. In other words, the steering angle of the coherent radiation beam from activated sub-array 900 can be controlled by the magnitude of the phase shift, which itself is controlled through $\Delta V_G$. Note that $\Delta V_G$ can be varied either in a positive value range above $\Delta V_G=0$ to effectuate a continuous phase shift in one direction, or a negative range below $\Delta V_G=0$ to effectuate a continuous phase shift in another direction. This results in the coherent radiation beam of sub-array 900 to be continuously steered either toward the radiation angle when unit cell 902 is ON while unit cell 904 is OFF, or toward the radiation angle when unit cell 904 is ON while unit cell 902 is OFF, thereby covering the blind zone between these two radiation angles. Hence, the activated row sub-array 900 of 1×2 unit cells in the disclosed reconfigurable array 200 provides the capability of continuous, uninterrupted, and fine-resolution radiation beam steering in a first dimension within the E-plane.

Figure 10:
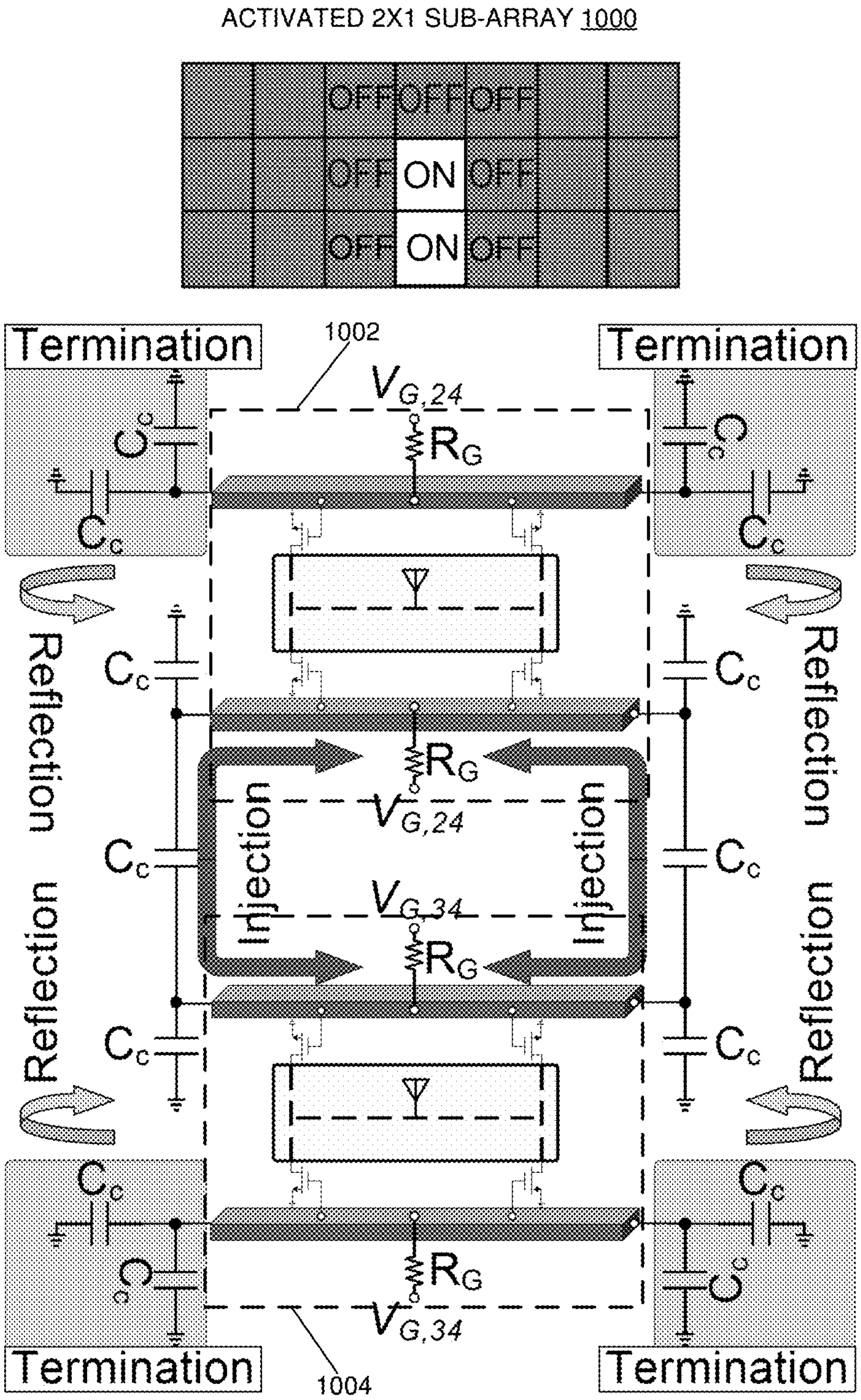
FIG. 10 shows the circuit diagram of an activated sub-array of 2×1 unit cells in the disclosed 3×7 reconfigurable array surrounded by OFF cells in accordance with some embodiments.
Figure 11A:
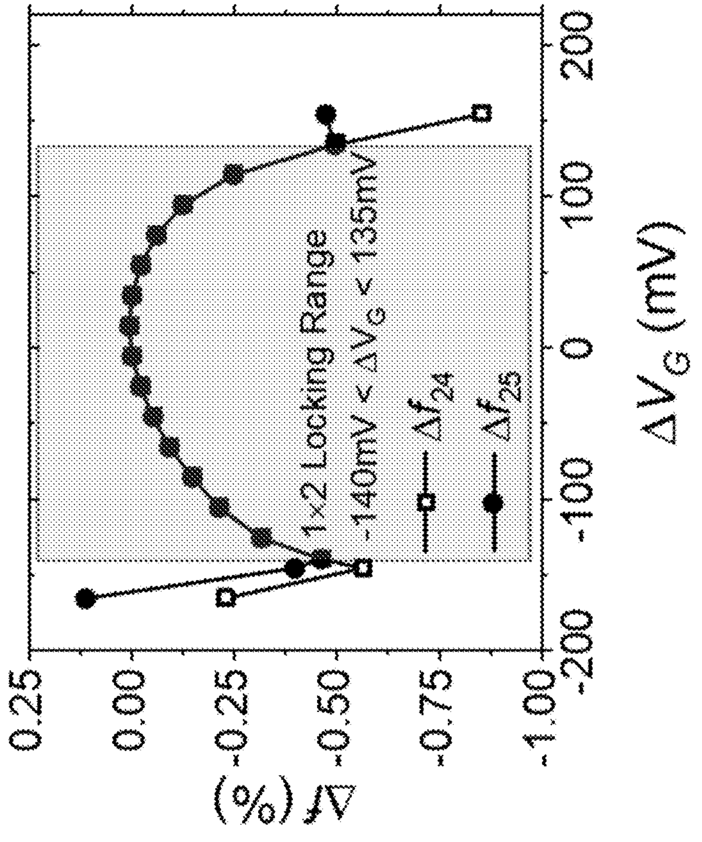
FIG. 11A shows a measured locking range of the differential voltage $\Delta V_G$ for a 1×2 sub-array in the 3×7 reconfigurable array in accordance with some embodiments.
Figure 11B:
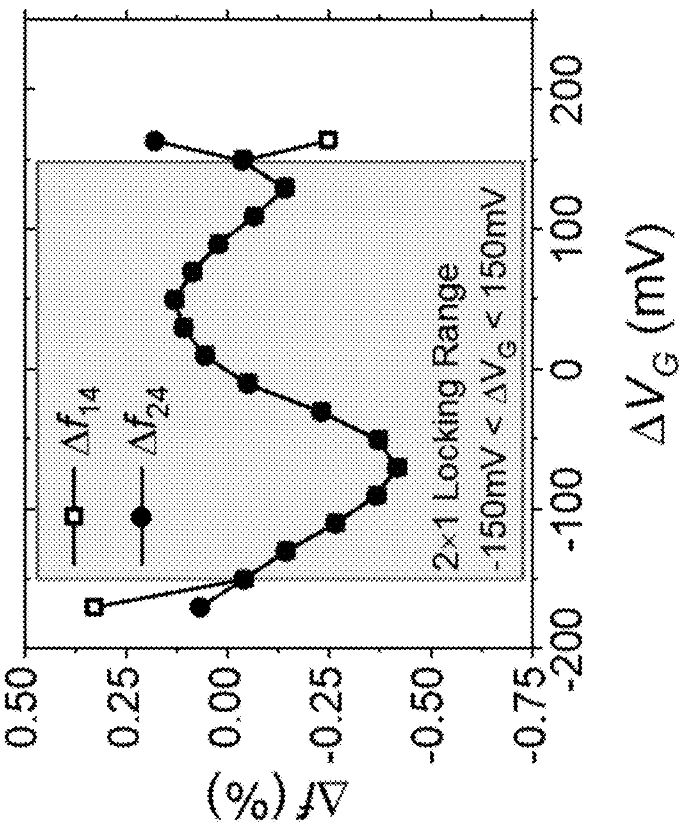
FIG. 11B shows a measured locking range of $\Delta V_G$ for a 2×1 sub-array in the 3×7 reconfigurable array in accordance with some embodiments.

FIG. 10 shows the circuit diagram of an activated sub-array 1000 of 2×1 unit cells in the disclosed 3×7 reconfigurable array 200 surrounded by OFF cells in accordance with some embodiments. As can be seen in FIG. 10, activated sub-array 1000 includes two unit cells 1002 and 1004 that are injection coupled in a column through the two vertical capacitors between unit cells 1002 and 1004. Similarly, it is assumed that unit cells 1002 and 1004 have been activated simultaneously to effectuate the injection locking. Moreover, the four capacitors coupled to the upper gate line of unit cells 1002 and the four capacitors coupled to the bottom gate line of unit cells 1004 form the terminations at the top and bottom edges of sub-array 1000. These terminations allow power to be reflected back and forth between the top and bottom edges of sub-array 1000. The injection locking between unit cells 1002 and 1004 generates a coherent radiation beam with a radiation angle between the two radiation angles when the two unit cells 1002 and 1004 are individually activated.

Note that unit cells 1002 and 1004 have the corresponding (row, column) indices of (2, 4) and (3, 4) respectively within reconfigurable array 200. Hence, the differential voltage between the two gate bias voltages of the two unit cells can be expressed as $\Delta V_G = V_{G,24} - V_{G,34}$. Again when $\Delta V_G=0$, unit cells 1002 and 1004 generate a coherent radiation beam having a radiation angle half way between the two radiation angles when the two unit cells 1002 and 1004 are individually activated. However, the steering angle of the coherent radiation beam can be controlled by varying $\Delta V_G$ around $\Delta V_G=0$ to effectuate a continuous phase shift. This causes the coherent radiation beam of sub-array 1000 to be continuously steered either toward the radiation angle when unit cell 1002 is ON while unit cell 1004 is OFF, or toward the radiation angle when unit cell 1004 is ON while unit cell 1002 is OFF, thereby covering the blind zone between these two radiation angles. Hence, the activated column sub-array 1000 of 2×1 unit cells in the disclosed reconfigurable array 200 provides the capability of continuous, uninterrupted, and fine-resolution radiation beam steering in a second dimension within the H-plane. Consequently, by combing an activated row sub-array of 1×2 unit cells and an activated column sub-array of 2×1 unit cells, the disclosed reconfigurable radiator array and the disclosed lens-integrated reconfigurable radiator array system can provide continuous, uninterrupted, and fine-resolution two-dimensional (2D) beam steering in both the E-plane and the H-plane.

Note that for either the 1×2 row sub-array 900 or the 2×1 column sub-array 1000, the corresponding $\Delta V_G$ is associated with a locking range, such that as long as $\Delta V_G$ is within the respective locking range, the two unit cells within sub-array 900 or sub-array 1000 remain injection locked to generate a single coherent radiation beam. FIG. 10A shows a measured locking range of the differential voltage $\Delta V_G$ for a 1×2 sub-array in the 3×7 reconfigurable array 200 in accordance with some embodiments. As can be seen in the plot of FIG. 10A, the two row cells remain locked within a locking range $-140\ mV<\Delta V_G<135\ mV$. Similarly, FIG. 10B shows a measured locking range of $\Delta V_G$ for a 2×1 sub-array in the 3×7 reconfigurable array 200 in accordance with some embodiments. As can be seen in the plot of FIG. 10B, the two column cells remain locked within a locking range $-150\ mV<\Delta V_G<150\ mV$. Note that these wide locking ranges of $\Delta V_G$ can create sufficient amounts of phase shifts between the two injection-locked cells to cover the respective dead zones.

Note that the grounded capacitors $C_c$ between the unit cells shunt part of the injection power. Therefore, larger $C_c$ values may lead to an increase in injection leakage but also result in a stronger series injection and better termination at the edges of the unit cells. Hence, the size of $C_c$ is carefully selected based on the above tradeoffs. Generally speaking, the size of $C_c$ is designed to ensure both robust injection coupling and adequate terminations for both 1×2 and 2×1 sub-array operations.

FIGS. 12A-12D illustrate a combination of antenna displacement-base beam steering and phase-shifting-based beam steering to achieve continuous, uninterrupted, and fine-resolution beam steering using 2 adjacent unit cells in the disclosed reconfigurable array, in accordance with some embodiments.

Figure 12A:
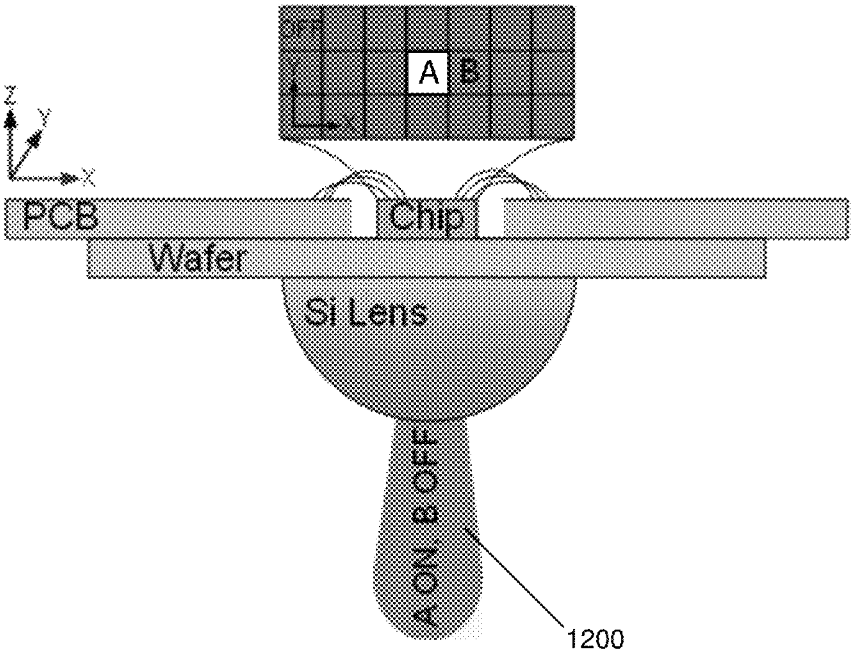
FIG. 12A shows activating a center unit cell in the disclosed lens-integrated reconfigurable radiator system to generate a centered radiation beam in accordance with some embodiments.

Specifically, FIG. 12A shows activating a center unit cell in the disclosed lens-integrated reconfigurable radiator system to generate a centered radiation beam 1200 in accordance with some embodiments. As can be seen in FIG. 12A, the unit cell "A" in the center of the radiator chip is activated while all other unit cells, including the neighboring unit cell "B" to unit cell "A" in the radiator chip are turned off. This creates a center radiation beam 1200 with a firing angle in the −Z direction (downward) and perpendicular to the X-Y plane.

Figure 12B:
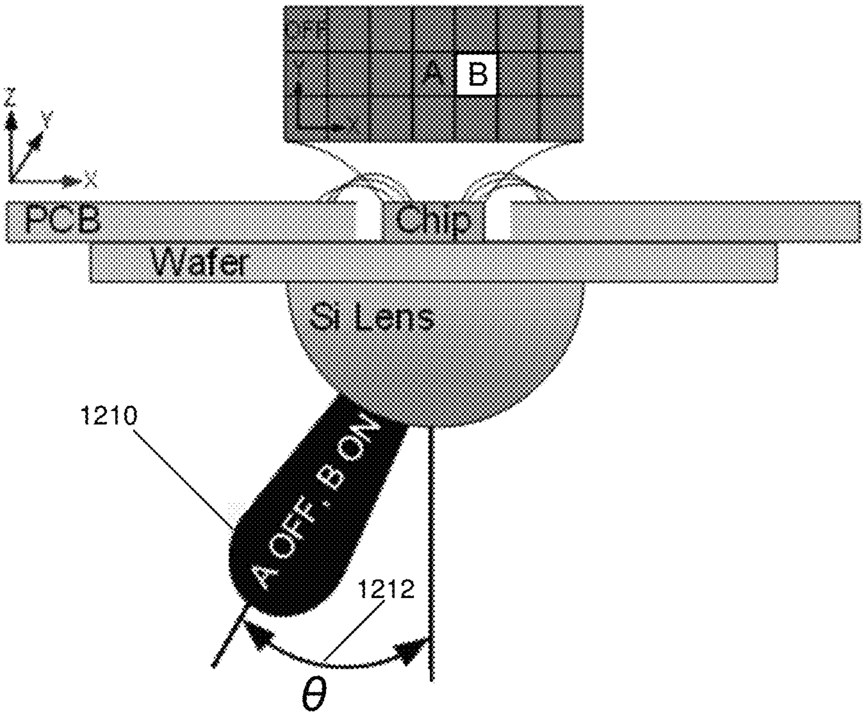
FIG. 12B shows activating a single unit cell next to the center unit cell in the disclosed lens-integrated reconfigurable radiator system to generate an off-centered radiation beam in accordance with some embodiments.

Similarly, FIG. 12B shows activating a single unit cell next to the center unit cell in the disclosed lens-integrated reconfigurable radiator system to generate an off-centered radiation beam, in accordance with some embodiments. As can be seen in FIG. 12B, the unit cell "B" in the same row but on the immediate right of the center unit cell "A" is activated while all other unit cells, including the center unit cell "A" in the radiator chip are turned off. This creates a radiation beam 1210 in the same X-Z plane as radiation beam 1200 but with firing angle that is θ degree offset from the center beam firing angle. In some embodiments, θ can be somewhere in between 5° to 15°, e.g., ~10°. Note that because there are no other radiation sources between unit cells "A" and "B," the angular space between radiation beam 1210 in FIG. 12B and center radiation beam 1200 in FIG. 12A is the above described blind zone 1212.

Figure 12C:
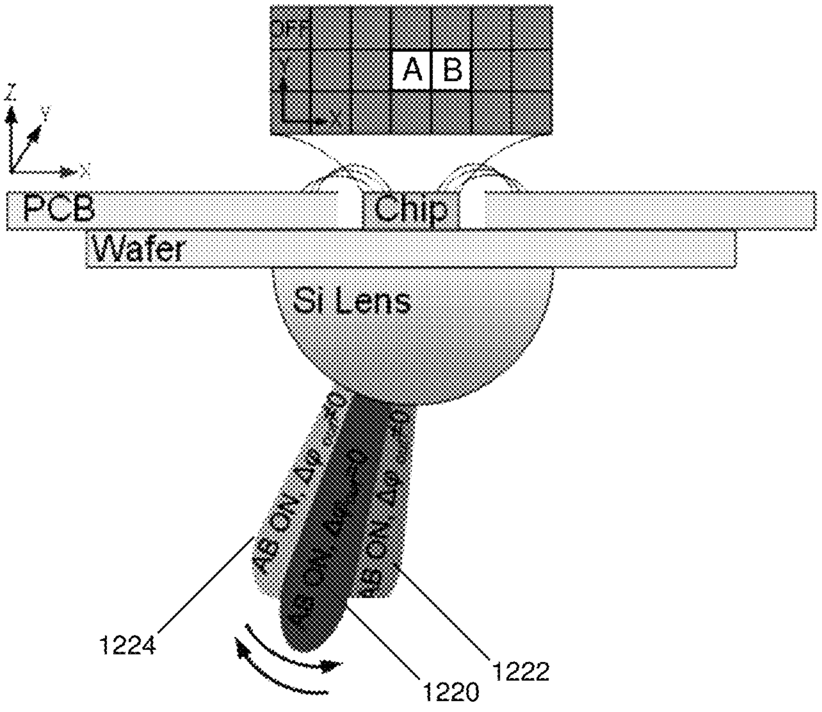
FIG. 12C shows simultaneously activating two adjacent unit cells in the disclosed lens-integrated reconfigurable radiator system to generate a single coherent radiation beam that can be steered inside the blind zone in FIG. 12B in accordance with some embodiment.

FIG. 12C shows simultaneously activating two adjacent unit cells in the disclosed lens-integrated reconfigurable radiator system to generate a single coherent radiation beam that can be steered inside the blind zone 1212 in FIG. 12B, in accordance with some embodiments. As can be seen in FIG. 12C, both unit cells "A" and "B" are now activated while all other unit cells in the radiator chip remain turned off. The above-described injection locking effect causes unit cells "A" and "B" to operate coherently and generate a single steerable radiation beam. FIG. 12C illustrates a number of scenarios associated with the steerable radiation beam. Specifically, we define a phase difference (i.e., the phase shift) between the phases of the radiation outputs of unit cells "A" and "B" as $A\ p=\varphi_{out,A}-\varphi_{out,B}$. As described above, this phase shift $\Delta\varphi$ can be controlled by the differential gate voltage $\Delta V_G=V_{G,A}-V_{G,B}$ associated with unit cells "A" and "B."

In the first scenario, $\Delta V_G=0$ and hence $\Delta\varphi=0$. As a result, a single coherent radiation beam 1220 is generated with a fire angle somewhere half-way between radiation beam 1200 in FIG. 12A and radiation beam 1210 in FIG. 12B. Note that even in this scenario, radiation beam 1220 is inside the blind zone 1212. In the second scenario, $\Delta V_G>0$ and hence $\Delta\varphi>0$. As a result, the coherent radiation beam generated by activated unit cells "A" and "B" is steered away from radiation beam 1220 toward the direction of the center radiation beam 1200 in FIG. 12A. For example, FIG. 12C illustrates an exemplary coherent radiation beam 1222 corresponding to the second scenario, which has a firing angle somewhere between the coherent radiation beam 1220 and the center radiation beam 1200 in FIG. 12A. Note that in the second scenario, radiation beam 1222 remains inside the blind zone 1212 but at a different location from radiation beam 1220.

In the third scenario, $\Delta V_G<0$ and hence $\Delta\varphi<0$. As a result, the coherent radiation beam generated by activated unit cells "A" and "B" is steered away from radiation beam 1220 toward the direction of the center radiation beam 1210 in FIG. 12B. For example, FIG. 12C illustrates an exemplary coherent radiation beam 1224 corresponding to the third scenario that has a firing angle somewhere between the coherent radiation beam 1220 and the radiation beam 1210 in FIG. 12B. Note that in the third scenario, radiation beam 1224 remains inside the blind zone 1212 but at a different location from both radiation beams 1220 and 1222. Hence, to generate a coherent radiation beam using unit cells "A" and "B" in any desirable firing angle within blind zone 1212, we only need to determine the correct $\Delta\varphi$ for that firing angle and then effectuate the correct $\Delta\varphi$ by generating a proper $\Delta V_G$.

Figure 12D:
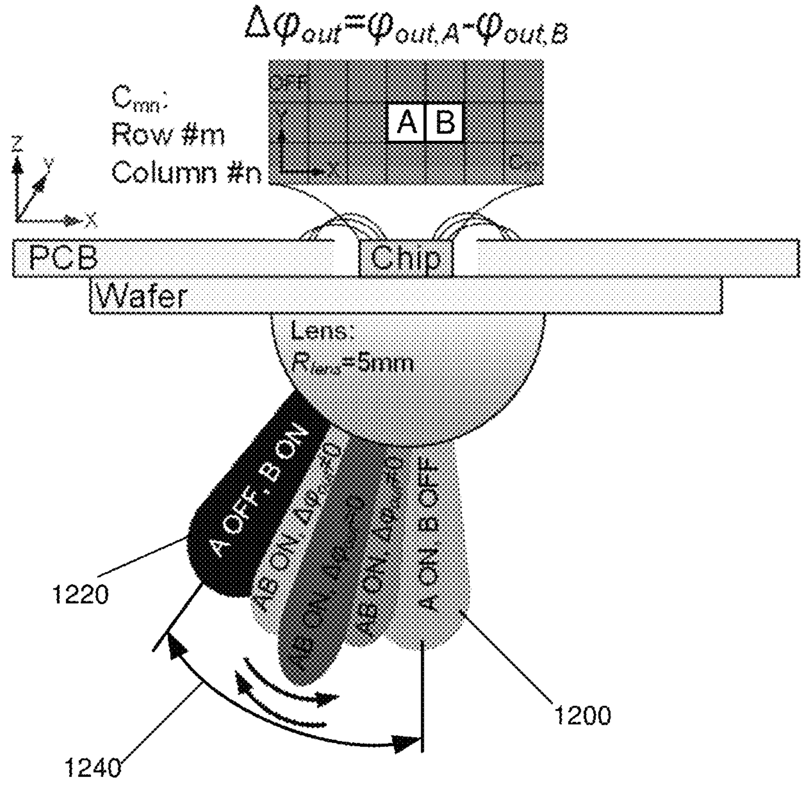
FIG. 12D shows combining two beam steering techniques: (1) antenna displacement; and (2) phase shifting using two injection-locked adjacent unit cells in the disclosed reconfigurable radiator array to cover a single scanning/steering range in accordance with some embodiments.

FIG. 12D shows a combination of the beam steering techniques of antenna displacement and phase shifting using two injection-locked adjacent unit cells in the disclosed reconfigurable radiator array to cover a single scanning/steering range, in accordance with some embodiments. Note that the radiation pattern shown in FIG. 12D combines the radiation patterns from FIGS. 12A-12C to indicate a scanning range 1240 bordered by individual radiation beams 1200 and 1210, and high-resolution continuous steering scanning within the scanning range 1240. Specifically, radiation beams 1200 and 1210 are high-directivity beams that generally have narrower beam profiles. The angular separation between radiation beams 1200 and 1210 indicates that a coarse beam steering can be simply achieved by individually activating a unit cell that is displaced from the center unit cell "A" in either the row direction or the column direction.

For example, activating unit cell "B" while unit cell "A" is OFF is equivalent to steering the center radiation beam 1200 by θ (e.g., θ=10°) in the X-Z plane toward +X direction. Similarly, by activating the unit cell (2, 3) to the left of unit cell "A" is equivalent to steering the center radiation beam 1200 by θ (e.g., 0=10°) in the X-Z plane toward −X direction. Likewise, if an even greater firing angle in the E-plane is needed, we can either activate unit cell (2, 6) or unit cell (2, 2), which are further displaced from center unit cell "A," to generate a high-directivity beam with a firing angle of ~2θ in the E-plane either toward +X direction or toward −X direction. Note that antenna-displacement-based beam steering in the Y-Z (H) plane works in the similar manner as above, except for requiring activation of a unit cell either in the first row above unit cell "A" or in the third row below unit cell "A." However, regardless in which direction the beam is being steered, antenna-displacement-based beam steering in the disclosed reconfigurable radiator array is discrete and coarse with very low scanning resolution.

As already described in FIG. 12C, the disclosed reconfigurable radiator array achieves continuous and high-resolution beam steering in each discrete scanning range, such as scanning range 1240, using the above-described phase-shifting technique. Specifically, continuous and fine-resolution beam steering within each discrete scanning range can be achieved by simultaneously activating both unit cells, e.g., unit cells "A" and "B" that define boundaries of the discrete scanning range. The two unit cells that are injection-locked to each other operate coherently to generate a single steerable radiation beam within the discrete scanning range, and the steerable radiation beam can scan and cover the entire discrete scanning range without leaving any blind spot by controlling the phase shift $\Delta\varphi$ (through the differential gate voltage $\Delta V_G$ between the two injection-locked unit cells. FIG. 12D shows that by combining the antenna displacement technique for coarse beam steering and the phase shifting technique for fine beam steering, the disclosed reconfigurable radiator array and the associated and lens-integrated system can cover a wide scanning range composed of multiple of the discrete scanning ranges in both the E-plane and H-plane.

Note that the proposed continuous and fine-resolution beam steering system and technique is highly scalable based on the size of the disclosed reconfigurable radiator array. In other words, if it is desirable to extend the overall steering/scanning range beyond the available scanning range associated with the exemplary 3×7 reconfigurable radiator array 200, the disclosed beam steering system and technique can increase the size of the reconfigurable radiator array by adding one or more additional rows of unit cells and/or one or more additional columns of unit cells. For example, a larger 4×8 reconfigurable radiator array can have a wider steering/scanning range than reconfigurable radiator array 200 in both (2D) steering directions.

Figure 13:
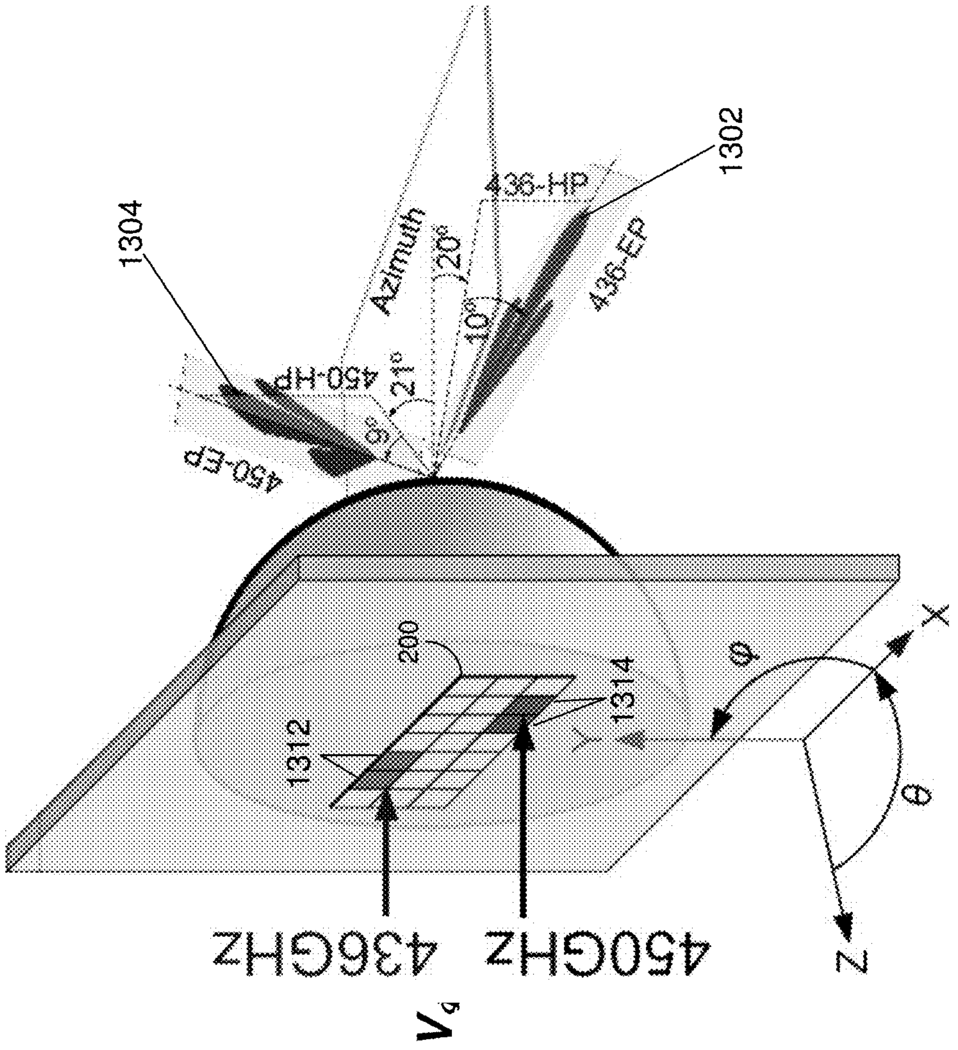
FIG. 13 shows an exemplary activation configuration of the disclosed lens-integrated reconfigurable radiator system to enable the above-described multi-beam operation in accordance with some embodiments.

FIG. 13 shows an exemplary activation configuration of the disclosed lens-integrated reconfigurable radiator system 300 to enable the above-described multi-beam operation in accordance with some embodiments. In the embodiments shown, two radiation beams 1302 and 1304 without intersecting corners are simultaneously generated. Note that each of the two radiation beams 1302 and 1304 is generated by a respective 1×2 sub-array 1312 or 1314 in the reconfigurable radiator array 200, with sub-array 1312 located in the first row and sub-array 1314 located in the third row but on the opposite side of the array from sub-array 1312.

Moreover, each of the concurrent and independent radiation beams 1302 and 1304 is formed based on the same concept of injection locking as described in conjunction with FIGS. 12A-12D and therefore is capable of continuous and fine-resolution scanning within the respective scanning range in both E-plane and the H-plane (thereby referred to as "2D" steering). Finally, the two concurrent and independent radiation beams 1302 and 1304 can be configured to operate at different frequencies. In an exemplary implementation, radiation beam 1302 operates at 436 GHz whereas radiation beam 1304 operates at 450 GHz. In other implementations, radiation beams 1302 and 1304 can also operate at the same operating frequency without departing from the present scope.

Figure 14:
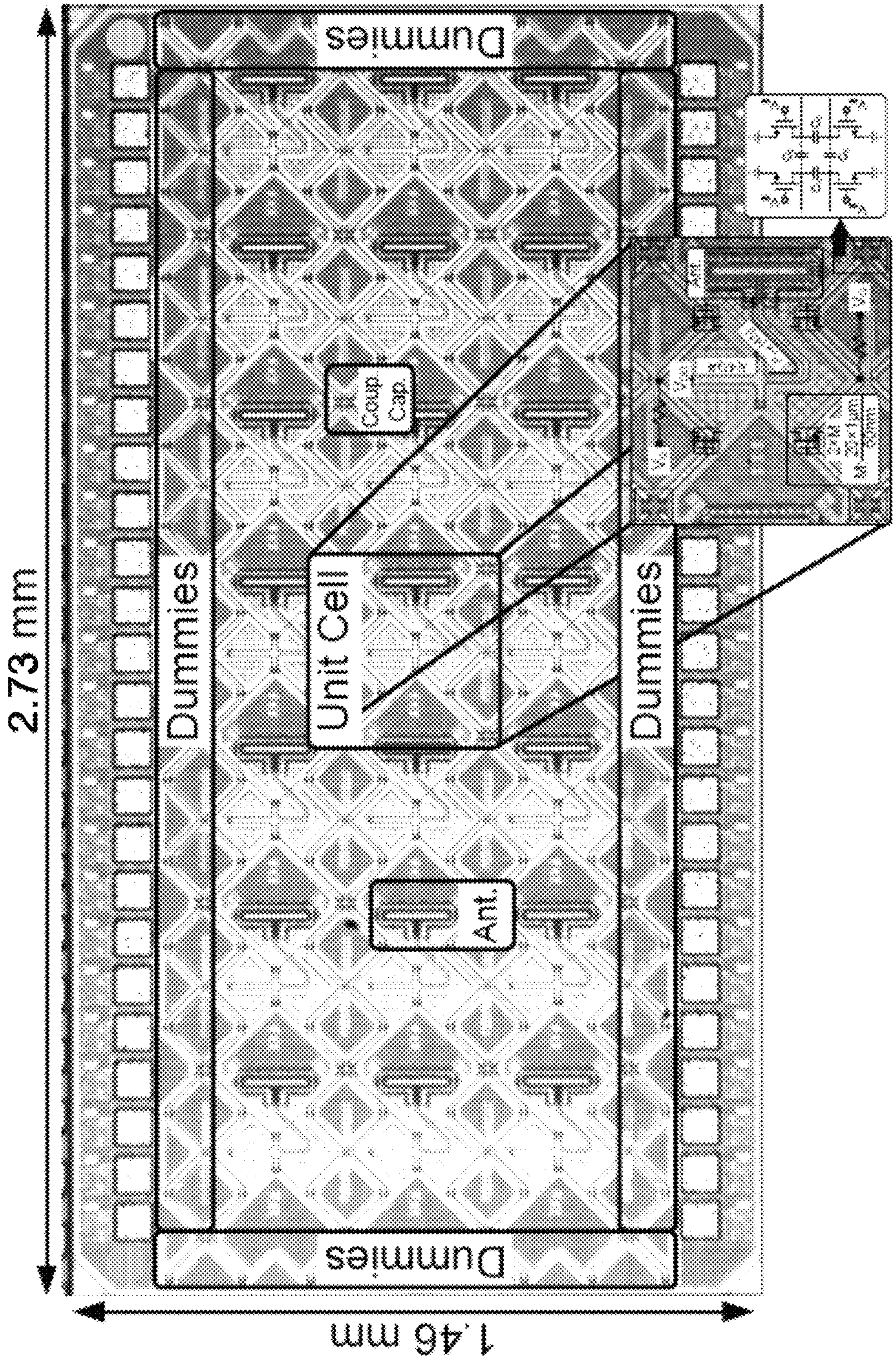
FIG. 14 shows a chip micrograph of the 436-467 GHz lens-integrated reconfiguration radiation source with continuous 2D steering and multi-beam operation capabilities in accordance with some embodiments.

FIG. 14 shows a chip micrograph of the 436-467 GHz lens-integrated reconfiguration radiation source with continuous 2D steering and multi-beam operation capabilities in accordance with some embodiments. The chip was fabricated in a 65 nm CMOS process and occupied an area about 4-mm$^2$ In some implementations, the chip was mounted inside an opening in the PCB to a high-resistivity undoped Si wafer. Additional wafers were added to implement $L_{ext}$=1.5 and 2 mm. A silicon lens with 5 mm radius was used and all the presented radiation patterns were measured at a far field distance of 14 cm. The operation frequency overlap of single and 1×2 configurations cover 435.8 to 467.3 GHz resulting in 7% tuning range. The implemented radiator system has achieved both high directivity in all scanning directions and continuous beam steering capabilities, which enables using the implemented radiator system in high resolution operation in an imaging/sensing system.

Compared with existing lens-integrated phased array systems, the disclosed lens-integrated reconfigurable radiator array system can provide continuous and high-resolution scanning ranges without blind zones within the scanning ranges with increased beam directivity at significantly lower power consumption. Moreover, the disclosed lens-integrated reconfigurable radiator array system provides multi-beam scanning and 2D scanning capabilities, and a wider operation frequency band. The disclosed lens-integrated reconfigurable radiator array system uses standing wave oscillators as unit cell building blocks. However, the disclosed beam steering techniques using a reconfigurable radiator array can also be generalized and employed in other system setups, at different operating frequencies, combined with other technologies, and/or using different types of unit cell sources. The disclosed beam steering system and techniques can be used in different types of wireless systems, but can be particularly desirable in high-resolution THz imaging applications.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A system that provides a lens-integrated reconfigurable radiating source capable of two-dimensional continuous beam steering, comprising:

a chip comprising a two-dimensional (2D) array of unit cells, wherein each unit cell in the 2D array includes an on-chip antenna for radiating power, and wherein each unit cell in the 2D array can be independently turned on or turned off; and a silicon (Si) lens coupled to the chip for controlling a directivity of a radiation beam generated by the chip; and wherein the 2D array is configured to effectuate injection locking between two or more adjacent unit cells in the 2D array when the two or more adjacent unit cells are turned on simultaneously, and wherein the injection locking between the two or more adjacent unit cells effectuates a resulting radiation beam in a desired direction.

2. The system of claim 1, wherein each unit cell in the 2D array comprises:

two standing wave oscillators (SWO) configured to generate a standing wave at a fundamental frequency; and a coupling network coupled between the two SWOs and configured to extract the 4th harmonic of the standing wave which is fed to the on-chip antenna for radiation.

3. The system of claim 1, wherein each unit cell in the 2D array is controlled by a gate bias voltage independent from other gate bias voltages for controlling other unit cells in the 2D array, which allows for turning each unit cell on and off independently from other unit cells in the 2D array.

4. The system of claim 1, wherein each unit cell in the 2D array is coupled to neighboring unit cells through a set of capacitors $C_c$ in both horizontal and vertical directions; and wherein the set of capacitors $C_c$ becomes termination capacitors when the unit cell is turned off, thereby suppressing the loading effect of the unit cell on an activated unit cell in the neighboring unit cells.

5. The system of claim 4, wherein when two adjacent unit cells are simultaneously activated, the resulting radiation beam can be steered by controlling a relative phase shift between the two adjacent unit cells to cover a blind zone between two adjacent radiation beams produced when the two adjacent unit cells are individually activated.

6. The system of claim 5, wherein the relative phase shift between the two adjacent activated unit cells is are controlled by changing the difference between the two gate bias voltages of the two adjacent activated unit cells.

7. The system of claim 4, wherein the 2D array includes a set of transistor switches located at four corners of each unit cell, wherein the set of transistor switches in each unit cell are automatically controlled by the gate bias voltage, thereby configuring the 2D array for proper operation when different unit cells are turned on or off.

8. The system of claim 7, wherein when a unit cell in the 2D array is turned off, the associated transistor switches are automatically closed, which turns capacitors $C_c$ coupled to the unit cell into termination capacitors for the neighboring unit cells unit cells, thereby suppressing loading effects from the turned-off unit cell and ensuring undisturbed operation of activated cells in the neighboring unit cells.

9. The system of claim 7, wherein when a unit cell in the 2D array is turned on, the associated transistor switches are open, which allows the unit cell to couple to the neighboring unit cells through associated capacitors for $C_c$ injection locking.

10. The system of claim 4, wherein when unit cells in a subsection of the 2D array are turned on, associated capacitors $C_c$ act as coupling capacitors between the activated unit cells in the subsection while act as terminations at edges of the subsection.

11. The system of claim 1, wherein the 2D array is configured to activate individual unit cells to facilitate generating individual high-directivity radiation beams in a discrete set of desired radiation angles.

12. The system of claim 11, wherein the 2D array is configured to activate different sub-arrays of unit cells to facilitate generating different steerable radiation beams that can be continuously steered within blind zones created by the discrete set of desired radiation angles.

13. The system of claim 12, wherein the continuous beam steering of a steerable radiation beam is achieved by combining the following two steering techniques:

providing unit coarse steering through an antenna displacement of an activated unit cell relative to a center of the Si lens; and providing high-resolution steering through a varying phase shift between two adjacent activated unit cells to cover a blind zone between two discrete radiation beams generated by the same two adjacent unit cells when they are independently activated.

14. The system of claim 1, wherein the 2D array is configured to effectuate a multi-beam radiation operation by simultaneously activating multiple subarrays in different regions within the 2D array which do not have intersecting corners.

15. The system of claim 1, wherein the multi-beam radiation operation includes generating two steerable radiation beams from two independently activated sub-arrays, wherein each of the two activated sub-arrays includes at least two adjacent activated unit cells that are injection-locked to each one another, and wherein the two steerable radiation beams are used to independently scan two desirable scanning ranges in either the same angular dimension or in two orthogonal angular dimensions.

16. The system of claim 15, wherein the first sub-array in the two independently activated sub-arrays includes at least two adjacent unit cells in a same row in the 2D array of unit cells for scanning a first scanning range in a first angular dimension; and wherein the second sub-array in the two independently activated sub-arrays includes at least two adjacent unit cells in a same column in the 2D array of unit cells for scanning a second scanning range in a second angular dimension orthogonal to the first angular dimension, and wherein the first sub-array and the second sub-array have no overlapping unit cells.

17. The system of claim 1, further comprising a wafer of a predetermined thickness sandwiched between the Si lens of hemispherical shape and the chip, wherein the predetermined thickness of the wafer provides an extension length to the height of the hemispherical Si lens.

18. A reconfigurable radiator array, comprising:

a two-dimensional (2D) array of unit cells, wherein each unit cell in the 2D array includes:

a 4th-harmonic standing wave oscillator (SWO); and an on-chip antenna for radiating power; and radiation control circuitry coupled to each unit cell in the 2D array and configured to:

activate a single unit cell in the 2D array to generate a high-directivity radiation beam in a single direction; and/or simultaneously activate two adjacent unit cells in the 2D array to effectuate injection locking between the two adjacent unit cells, thereby effectuates a coherent and steerable radiation beam that can be steering within a desirable scanning range.

19. The reconfigurable radiator array of claim 18, wherein the radiation control circuitry controls each unit cell in the 2D array by controlling a gate bias voltage independent from other gate bias voltages for controlling other unit cells in the 2D array, thereby allowing for turning each unit cell on and off independently from other unit cells in the 2D array.

20. The reconfigurable radiator array of claim 19, wherein each unit cell includes a set of transistor switches located at four corners of the unit cell, wherein the set of transistor switches are automatically controlled by the gate bias voltage.

21. The reconfigurable radiator array of claim 20, wherein when the unit cell is turned off, the set of transistor switches are automatically closed, which turns the set of capacitors $C_c$ coupled to the unit cell into termination capacitors for the neighboring unit cells unit cells, thereby suppressing loading effects from the turned-off unit cell and ensuring undisturbed operation of activated cells in the neighboring unit cells.

22. The reconfigurable radiator array of claim 18, wherein each unit cell in the 2D array is coupled to neighboring unit cells through a set of capacitors Ce in both horizontal and vertical directions; and wherein the set of capacitors $C_c$ becomes termination capacitors when the unit cell is turned off, thereby suppressing the loading effect of the unit cell on an activated unit cell in the neighboring unit cells.

23. The reconfigurable radiator array of claim 18, wherein the radiation control circuitry is configured to effectuate a multi-beam radiation operation in the 2D array of unit cells by simultaneously activating multiple subarrays in different regions within the 2D array which do not have intersecting corners.

24. The reconfigurable radiator array of claim 23, wherein the radiation control circuitry effectuates the multi-beam radiation operation by generating two steerable radiation beams from two independently activated sub-arrays in the 2D array of unit cells, wherein each of the two activated sub-arrays includes at least two adjacent activated unit cells that are injection-locked to each one another, and wherein the two steerable radiation beams are used to independently scan two desirable scanning ranges in either the same angular dimension or in two orthogonal angular dimensions.

25. The reconfigurable radiator array of claim 24, wherein the first sub-array in the two independently activated sub-arrays includes at least two adjacent unit cells in a same row in the 2D array of unit cells for scanning a first scanning range in a first angular dimension; and wherein the second sub-array in the two independently activated sub-arrays includes at least two adjacent unit cells in a same column in the 2D array of unit cells for scanning a second scanning range in a second angular dimension orthogonal to the first angular dimension, and wherein the first sub-array and the second sub-array have no overlapping unit cells.

26. A method for providing continuous beam steering using a reconfigurable radiating source comprising a two-dimensional (2D) array of unit cells, the method comprising:

simultaneously activating two adjacent unit cells in the 2D array of unit cells to effectuate injection locking between the two adjacent unit cells, thereby obtaining a coherent radiation beam in a specific radiation angle; and steering the coherent radiation beam within a target scanning range by controlling a relative phase shift between the two adjacent activated unit cells.

27. The method of claim 26, wherein controlling the relative phase shift between the two adjacent activated unit cells includes controlled a difference between the two gate bias voltages of the two adjacent activated unit cells.

* * * * *